(12) United States Patent
Kuwayama et al.

(10) Patent No.: US 10,713,401 B2
(45) Date of Patent: Jul. 14, 2020

(54) SURFACE SHAPE DEFECT GENERATING REGION ESTIMATING METHOD, SURFACE SHAPE DEFECT SOURCE REGION ESTIMATING METHOD, SURFACE SHAPE DEFECT GENERATING REGION ESTIMATING DEVICE, SURFACE SHAPE DEFECT SOURCE REGION ESTIMATING DEVICE, PROGRAM, AND RECORDING MEDIUM

(71) Applicant: NIPPON STEEL & SUMITOMO METAL CORPORATION, Tokyo (JP)

(72) Inventors: Takuya Kuwayama, Kisarazu (JP); Takashi Ariga, Kisarazu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 476 days.

(21) Appl. No.: 15/537,956

(22) PCT Filed: Jan. 22, 2016

(86) PCT No.: PCT/JP2016/051821
§ 371 (c)(1),
(2) Date: Jun. 20, 2017

(87) PCT Pub. No.: WO2016/121638
PCT Pub. Date: Aug. 4, 2016

(65) Prior Publication Data
US 2018/0004873 A1 Jan. 4, 2018

(30) Foreign Application Priority Data
Jan. 26, 2015 (JP) .................................. 2015-012325

(51) Int. Cl.
*G06F 30/23* (2020.01)
*B21D 22/00* (2006.01)
*G06F 113/24* (2020.01)

(52) U.S. Cl.
CPC ............. *G06F 30/23* (2020.01); *B21D 22/00* (2013.01); *G06F 2113/24* (2020.01)

(58) Field of Classification Search
CPC .. G06F 17/5018; G06F 30/23; G06F 2113/24; B21D 22/00
(Continued)

(56) References Cited

U.S. PATENT DOCUMENTS

2008/0092620 A1 4/2008 Suzuki et al.
2010/0005845 A1* 1/2010 Yoshida .............. G06F 17/5018
72/31.01
(Continued)

FOREIGN PATENT DOCUMENTS

CN 101014428 A 8/2007
CN 102264486 A 11/2011
(Continued)

OTHER PUBLICATIONS

Chinese Office Action and Search Report for counterpart Chinese Application No. 201680005686.0, dated Jul. 19, 2018, with an English translation of the Search Report.
(Continued)

*Primary Examiner* — Eunhee Kim
(74) *Attorney, Agent, or Firm* — Birch, Stewart, Kolasch & Birch, LLP

(57) ABSTRACT

There is provided a surface shape defect generating region estimating method for estimating a generating region of a surface shape defect of a deformation-processed product obtained by performing deformation processing with respect to a workpiece, the method including: a first stress distri-
(Continued)

bution obtaining process of obtaining first stress distribution $\sigma_{(T1)}$; a second stress distribution obtaining process of obtaining a second stress distribution $\sigma_{(T2)}$; a comparative stress distribution obtaining process of obtaining comparative stress distribution $\sigma_{(T1, T2)}$; a division comparative stress distribution obtaining process of obtaining division comparative stress distribution $\sigma_{DIV(T1, T2)}$; and a surface shape defect generating region estimating process of estimating whether or not each of the divided regions $D_K$ is a generating region of the surface shape defect.

32 Claims, 14 Drawing Sheets

(58) Field of Classification Search
USPC .................................................. 703/1, 6, 7
See application file for complete search history.

(56) References Cited

U.S. PATENT DOCUMENTS

| | | | |
|---|---|---|---|
| 2010/0241366 A1* | 9/2010 | Nonomura | G06F 17/5018 702/42 |
| 2011/0246150 A1* | 10/2011 | Miyagi | G06F 17/5018 703/2 |
| 2012/0035890 A1 | 2/2012 | Suzuki et al. | |
| 2013/0306200 A1 | 11/2013 | Kohno et al. | |

FOREIGN PATENT DOCUMENTS

| | | |
|---|---|---|
| CN | 102395973 A | 3/2012 |
| CN | 104001811 A | 8/2014 |
| EP | 2371464 A1 | 10/2011 |
| JP | 11-319971 A | 11/1999 |
| JP | 2004-209500 A | 7/2004 |
| JP | 2005-177837 A | 7/2005 |
| JP | 2009-286351 A | 12/2009 |
| JP | 4894294 B2 | 3/2012 |
| JP | 5068783 B2 | 11/2012 |
| RU | 2536711 C1 | 12/2014 |
| WO | WO 2010/073756 A1 | 7/2010 |

OTHER PUBLICATIONS

Russian Office Action and Search Report for counterpart Russian Application No. 2017124979, dated Jun. 28, 2018, with an English translation.
International Search Report for PCT/JP2016/051821 dated Apr. 19, 2016.
Written Opinion of the International Searching Authority for PCT/JP2016/051821 (PCT/ISA/237) dated Apr. 19, 2016.
Abbasi et al., "New Attempt to Wrinkling Behavior Analysis of Tailor Welded Blanks During the Deep Drawing Process," Materials and Design, vol. 40, 2012 (published online Apr. 16, 2012), pp. 407-414.
Extended European Search Report for counterpart European Application No. 16743241.8, dated Dec. 5, 2018.
Shafaat et al., "Effect of Different Yield Criteria on Prediction of Wrinkling Initiation of Interstitial-Free Galvanized Steel Sheet," Materials and Design, vol. 32, 2011 (published online Feb. 26, 2011), pp. 3370-3376.

* cited by examiner $\sigma'\ (T_1, T_2)$

SURFACE SHAPE DEFECT GENERATING REGION ESTIMATING METHOD, SURFACE SHAPE DEFECT SOURCE REGION ESTIMATING METHOD, SURFACE SHAPE DEFECT GENERATING REGION ESTIMATING DEVICE, SURFACE SHAPE DEFECT SOURCE REGION ESTIMATING DEVICE, PROGRAM, AND RECORDING MEDIUM

TECHNICAL FIELD OF THE INVENTION

The present invention relates to a method, a device, a program, and a recording medium, for estimating generating regions or source regions of a surface shape defect generated when performing a deformation processing with respect to a workpiece.

Priority is claimed on Japanese Patent Application No. 2015-012325, filed on Jan. 26, 2015, the content of which is incorporated herein by reference.

RELATED ART

Most of vehicle members, such as a door or a bumper, home electronics members, and building materials, are produced by press forming of a steel sheet. In recent years, a requirement for reducing the weight with respect to the members (press-formed article) has been increased, and in order to realize the requirement, it is suggested to make a steel material thin by using a steel material having a high strength.

However, as the strength of the steel sheet increases, it became necessary to strictly manage ensuring of the shape of the members made by press forming. In the management, important issues are such as generation of spring back which is a deformation due to an elastic recovery for the elastic deformation of the steel sheet, and is a deformation using a residual stress as a driving force generated in the steel sheet during press forming, and generation of wrinkles caused by bending during the press forming.

In particular, recently, in order to reduce the number of development processes and costs of a vehicle or the like, there is a tendency that the planning stage of investigating a forming method of the formed member starts at the same time as the design stage. However, when the design changes at the design stage, the formed member at the planning stage also changes at the same time, and thus, the number of processes or costs at the planning stage of investigating a forming method of a formed member are serious problems from the viewpoint of development processes or development costs of the vehicle or the like.

Above, in recent years, a method which can estimate generating regions or source regions of "spring back" or "wrinkles" described above at a planning stage of investigating the forming method, that is, at a stage before practically performing the forming, is desirable.

In the Patent Documents 1 to 3, as a method of specifying the source regions of the spring back, a method of specifying the source regions of the spring back by dividing a stress state into a plurality of specified regions at a bottom dead point of forming, by arithmetically computing the stress of the specified regions, and by performing spring back calculation, by a finite element method, is described.

PRIOR ART DOCUMENT

Patent Document

[Patent Document 1] Japanese Patent No. 5068783
[Patent Document 2] Japanese Patent No. 4894294
[Patent Document 3] Japanese Unexamined Patent Application, First Publication No. 2009-286351

DISCLOSURE OF THE INVENTION

Problems to be Solved by the Invention

In the related art, as described in Patent Documents 1 to 3, a method of estimating the generating regions or source regions of the "spring back" by objective indices, such as a residual stress, is investigated, but a method of quantitatively estimating the generating regions or the source regions of a surface shape defect, such as "wrinkles" or "surface deflection" generated during the press forming has not been investigated yet, and it has been required to establish the method.

Not being limited to the press forming of the steel sheet, similar problems also exist in a case of a roll forming of a steel material having a longitudinal shape or hydroforming of a steel pipe. In addition, a material of a workpiece is also not limited to steel, and even in a case of a metal material, such as aluminum or titanium, a glass fiber reinforced resin material, such as FRP or FRTP, and a composite material of these materials, similar problems exist.

Considering the above-described situation, an object of the present invention is to provide a method, a device, a program, and a recording medium, for estimating generating regions and source regions of a surface shape defect generated when performing deformation processing with respect to a workpiece.

Means for Solving the Problem

The gist of the present invention for solving the problem is as follows.

(1) According to an aspect of the present invention, there is provided a surface shape defect generating region estimating method for estimating generating regions of a surface shape defect of a deformation-processed product obtained by performing deformation processing with respect to a workpiece from a deformation processing starting point of time $T_{START}$ to a deformation processing ending point of time $T_{END}$, the method including: a first stress distribution obtaining process of obtaining first stress distribution $\sigma_{(T1)}$ which is distribution of a stress of the workpiece at a first working point of time $T_1$ that is after the deformation processing starting point of time $T_{START}$ and before the deformation processing ending point of time $T_{END}$, by a finite element method; a second stress distribution obtaining process of obtaining a second stress distribution $\sigma_{(T2)}$ which is distribution of a stress of the workpiece at a second working point of time $T_2$ that is after the first working point of time $T_1$ and before or at the same time as the deformation processing ending point of time $T_{END}$, by the finite element method; a comparative stress distribution obtaining process of obtaining comparative stress distribution $\sigma_{(T1, T2)}$ which is distribution of a comparative stress of the workpiece based on comparison of the first stress distribution $\sigma_{(T1)}$ and the second stress distribution $\sigma_{(T2)}$; a division comparative stress distribution obtaining process of obtaining division comparative stress distribution $\sigma_{DIV(T1, T2)}$ which is distribution of comparative stresses of each of divided regions $D_K$, by dividing the comparative stress distribution $\sigma_{(T1, T2)}$ into a plurality of divided regions $D_K$; and a surface shape defect generating region estimating process of estimating whether or not each of the divided regions $D_K$ is a generating region of the surface shape defect, based on a surface shape defect generation evaluation index $\alpha$ acquired with respect to each of the divided regions $D_K$, by using the division comparative stress distribution $\sigma_{DIV(T1, T2)}$.

(2) In the surface shape defect generating region estimating method according to (1), the surface shape defect generation evaluation index $\alpha$ may be the minimum value of the comparative stress.

(3) In the surface shape defect generating region estimating method according to (1), the surface shape defect generation evaluation index $\alpha$ may be the maximum value of a difference in comparative stress between two elements separated from each other.

(4) In the surface shape defect generating region estimating method according to (1), the surface shape defect generation evaluation index $\alpha$ may be the maximum value of a difference gradient obtained by dividing the difference in comparative stress between two elements separated from each other by the separation distance.

(5) In the surface shape defect generating region estimating method according to any one of (1) to (4), in the division comparative stress distribution obtaining process, a first divided region $D_1$ including an element of which the comparative stress is the minimum may be defined as one of the plurality of divided regions $D_K$ in the comparative stress distribution $\sigma_{(T1, T2)}$, and a second divided region $D_2$ including an element of which the comparative stress is the minimum may be defined as one of the plurality of divided regions $D_K$ in the comparative stress distribution $\sigma_{(T1, T2)}$ obtained by removing the first divided region $D_1$ from the comparative stress distribution $\sigma_{(T1, T2)}$.

(6) In the surface shape defect generating region estimating method according to any one of (1) to (4), in the division comparative stress distribution obtaining process, the first divided region $D_1$ including two elements that are a combination in which a difference in comparative stress between the two elements separated from each other becomes maximized may be defined as one of the plurality of divided regions $D_K$ in the comparative stress distribution $\sigma_{(T1, T2)}$, and the second divided region $D_2$ including two elements that are a combination in which a difference in comparative stress between the two elements separated from each other becomes maximized may be defined as one of the plurality of divided regions $D_K$ in the comparative stress distribution $\sigma_{(T1, T2)}$ obtained by removing the first divided region $D_1$ from the comparative stress distribution $\sigma_{(T1, T2)}$.

(7) In the surface shape defect generating region estimating method according to any one of (1) to (4), in the division comparative stress distribution obtaining process, the first divided region $D_1$ including two elements that are a combination in which a difference gradient obtained by dividing the difference in comparative stress between two elements separated from each other by the separation distance becomes maximized may be defined as one of the plurality of divided regions $D_K$ in the comparative stress distribution $\sigma_{(T1, T2)}$, and the second divided region $D_2$ including two elements that are a combination in which a difference gradient obtained by dividing the difference in comparative stress between two elements separated from each other by the separation distance becomes maximized may be defined as one of the plurality of divided regions $D_K$ in the comparative stress distribution $\sigma_{(T1, T2)}$ obtained by removing the first divided region $D_1$ from the comparative stress distribution $\sigma_{(T1, T2)}$.

(8) In the surface shape defect generating region estimating method according to any one of (1) to (7), the second working point of time $T_2$ may be deformation processing ending point of time $T_{END}$.

(9) In the surface shape defect generating region estimating method according to any one of (1) to (8), the workpiece may be metal.

(10) In the surface shape defect generating region estimating method according to any one of (1) to (9), the deformation processing may be press forming.

(11) In the surface shape defect generating region estimating method according to any one of (1) to (10), the surface shape defect may be wrinkles.

(12) According to a second aspect of the present invention, there is provided a surface shape defect source region estimating method, the method including: a region dividing process of specifying the generating regions of the surface shape defect estimated by the surface shape defect generating region estimating method according to any one of (1) to (11) as a reference region $m_0$, and dividing the periphery of the reference region $m_0$ into a plurality of peripheral regions $m_k$ (k=1, 2, 3, . . . n); a correction first stress distribution obtaining process of obtaining correction first stress distribution $\sigma'_{(T1)}$ in a case of changing a stress value of an arbitrary peripheral region $m_n$ among the plurality of peripheral regions $m_k$ for each of the peripheral regions $m_k$ in the first stress distribution $\sigma_{(T1)}$; a correction second stress obtaining process of obtaining correction second stress distribution $\sigma'_{(T2)}$ for each of the peripheral regions $m_k$ by performing forming analysis with respect to the correction first stress distribution $\sigma'_{(T1)}$ by a finite element method to the second working point of time $T_2$; a correction comparative stress distribution obtaining process of obtaining correction comparative stress distribution $\sigma'_{(T1, T2)}$ which is distribution of the correction comparative stress of the workpiece, based on comparison of the correction first stress distribution $\sigma'_{(T1)}$ and the correction second stress distribution $\sigma'_{(T2)}$, with respect to each of the peripheral regions $m_k$; and a surface shape defect source region estimating process of estimating whether or not each of the peripheral regions $m_k$ is a surface shape defect source region, based on a comparative value $\beta_{(mk, m0)}$ of a surface shape defect source evaluation index $\beta_{(mk)}$ in the reference region $m_0$ acquired by using the correction comparative stress distribution $\sigma'_{(T1, T2)}$ of each of the peripheral region $m_k$, and a surface shape defect source evaluation index $\beta_{(m0)}$ in the reference region $m_0$ acquired by using the comparative stress distribution $\sigma_{(T1, T2)}$.

(13) In the surface shape defect source region estimating method according to (12), the surface shape defect source evaluation indices $\beta_{(mk)}$ and $\beta_{(m0)}$ may be the minimum values of the correction comparative stress.

(14) In the surface shape defect source region estimating method according to (12), the surface shape defect source evaluation indices $\beta_{(mk)}$ and $\beta_{(m0)}$ may be the maximum values of a difference in correction comparative stress between two elements separated from each other.

(15) In the surface shape defect source region estimating method according to (12), the surface shape defect source evaluation indices $\beta_{(mk)}$ and $\beta_{(m0)}$ may be the maximum values of a difference gradient obtained by dividing a difference in correction comparative stress between two elements separated from each other by the separation distance.

(16) According to a third aspect of the present invention, there is provided a surface shape defect generating region estimating device which estimates a generating region of a surface shape defect of a deformation-processed product obtained by performing deformation processing with respect to a workpiece from a deformation processing starting point of time $T_{START}$ to a deformation processing ending point of time $T_{END}$, the device including: a first stress distribution obtaining portion which obtains first stress distribution $\sigma_{(T1)}$ which is distribution of a stress of the workpiece at a first working point of time $T_1$ that is after the deformation processing starting point of time $T_{START}$ and before the deformation processing ending point of time $T_{END}$, by a finite element method; a second stress distribution obtaining portion which obtains second stress distribution $\sigma_{(T2)}$ which is distribution of a stress of the workpiece at a second working point of time $T_2$ that is after the first working point of time $T_1$ and before or at the same time as the deformation processing ending point of time $T_{END}$, by the finite element method; a comparative stress distribution obtaining portion which obtains comparative stress distribution $\sigma_{(T1, T2)}$ which is distribution of a comparative stress of the workpiece based on comparison of the first stress distribution $\sigma_{(T1)}$ and the second stress distribution $\sigma_{(T2)}$; a division comparative stress distribution obtaining portion which obtains division comparative stress distribution $\sigma_{DIV(T1, T2)}$ which is distribution of the comparative stress of each of divided regions $D_K$, by dividing the comparative stress distribution $\sigma_{(T1, T2)}$ into a plurality of divided regions $D_K$; and a surface shape defect generating region estimating portion which estimates whether or not each of the divided regions $D_K$ is a generating region of the surface shape defect, based on a surface shape defect generation evaluation index $\alpha$ acquired with respect to each of the divided regions $D_K$, by using the division comparative stress distribution $\sigma_{DIV(T1, T2)}$.

(17) In the surface shape defect generating region estimating device according to (16), the surface shape defect generation evaluation index $\alpha$ may be the minimum value of the comparative stress.

(18) In the surface shape defect generating region estimating device according to (16), the surface shape defect generation evaluation index $\alpha$ may be the maximum value of a difference in comparative stress between two elements separated from each other.

(19) In the surface shape defect generating region estimating device according to (16), the surface shape defect generation evaluation index $\alpha$ may be the maximum value of a difference gradient obtained by dividing the difference in comparative stress between two elements separated from each other by the separation distance.

(20) In the surface shape defect generating region estimating device according to any one of (16) to (19), in the division comparative stress distribution obtaining portion, a first divided region $D_1$ including an element of which the comparative stress is the minimum may be defined as one of the plurality of divided regions $D_K$ in the comparative stress distribution $\sigma_{(T1, T2)}$, and a second divided region $D_2$ including an element of which the comparative stress is the minimum may be defined as one of the plurality of divided regions $D_K$ in the comparative stress distribution $\sigma_{(T1, T2)}$ obtained by removing the first divided region $D_1$ from the comparative stress distribution $\sigma_{(T1, T2)}$.

(21) In the surface shape defect generating region estimating device according to any one of (16) to (19), in the division comparative stress distribution obtaining portion, the first divided region $D_1$ including two elements that are a combination in which a difference in comparative stress between the two elements separated from each other becomes maximized may be defined as one of the plurality of divided regions $D_K$ in the comparative stress distribution $\sigma_{(T1, T2)}$, and the second divided region $D_2$ including two elements that are a combination in which a difference in comparative stress between the two elements separated from each other becomes maximized may be defined as one of the plurality of divided regions $D_K$ in the comparative stress distribution $\sigma_{(T1, T2)}$ obtained by removing the first divided region $D_1$ from the comparative stress distribution $\sigma_{(T1, T2)}$.

(22) In the surface shape defect generating region estimating device according to any one of (16) to (19), in the division comparative stress distribution obtaining portion, the first divided region $D_1$ including two elements that are a combination in which a difference gradient obtained by dividing the difference in comparative stress between two elements separated from each other by the separation distance becomes maximized may be defined as one of the plurality of divided regions $D_K$ in the comparative stress distribution $\sigma_{(T1, T2)}$, and the second divided region $D_2$ including two elements that are a combination in which a difference gradient obtained by dividing the difference in comparative stress between two elements separated from each other by the separation distance becomes maximized may be defined as one of the plurality of divided regions $D_K$ in the comparative stress distribution $\sigma_{(T1, T2)}$ obtained by removing the first divided region $D_1$ from the comparative stress distribution $\sigma_{(T1, T2)}$.

(23) In the surface shape defect generating region estimating device according to any one of (16) to (22), the second working point of time $T_2$ may be deformation processing ending point of time $T_{END}$.

(24) In the surface shape defect generating region estimating device according to any one of (16) to (23), the workpiece may be metal.

(25) In the surface shape defect generating region estimating device according to any one of (16) to (24), the deformation processing may be press forming.

(26) In the surface shape defect generating region estimating device according to any one of (16) to (25), the surface shape defect may be wrinkles.

(27) According to a fourth aspect of the present invention, there is provided a surface shape defect source region estimating device including: a region dividing portion which specifies the generating regions of the surface shape defect estimated by the surface shape defect generating region estimating device according to any one of (16) to (26) as a reference region $m_0$, and divides the periphery of the reference region $m_0$ into a plurality of peripheral regions $m_k$ (k=1, 2, 3, . . . n); a correction first stress distribution obtaining portion which obtains correction first stress distribution $\sigma'_{(T1)}$ in a case of changing a stress value of an arbitrary peripheral region $m_k$ among the plurality of peripheral regions $m_k$ for each of the peripheral regions $m_k$ in the first stress distribution $\sigma_{(T1)}$; a correction second stress obtaining portion which obtains correction second stress distribution $\sigma'_{(T2)}$ for each of the peripheral regions $m_k$ by performing forming analysis with respect to the correction first stress distribution $\sigma'_{(T1)}$ by a finite element method to the second working point of time $T_2$; a correction comparative stress distribution obtaining portion which obtains correction comparative stress distribution $\sigma'_{(T1, T2)}$ which is distribution of the correction comparative stress of the workpiece, based on comparison of the correction first stress distribution $\sigma'_{(T1)}$ and the correction second stress distribution $\sigma'_{(T2)}$, with respect to each of the peripheral regions $m_k$; and a surface shape defect source region estimating portion which estimates whether or not each of the peripheral regions $m_k$ is a surface shape defect source region, based on a comparative value $\beta_{(mk, m0)}$ of a surface shape defect source evaluation index $\beta_{(mk)}$ in the reference region $m_0$ acquired by using the correction comparative stress distribution $\sigma'_{(T1, T2)}$ of each of the peripheral region $m_k$, and a surface shape defect source evaluation index $\beta_{(m0)}$ in the reference region $m_0$ acquired by using the comparative stress distribution $\sigma_{(T1, T2)}$.

(28) In the surface shape defect source region estimating device according to (27), the surface shape defect source evaluation indices $\beta_{(mk)}$ and $\beta_{(m0)}$ may be the minimum values of the correction comparative stress.

(29) In the surface shape defect source region estimating device according to (27), the surface shape defect source evaluation indices $\beta_{(mk)}$ and $\beta_{(m0)}$ may be the maximum values of a difference in correction comparative stress between two elements separated from each other.

(30) In the surface shape defect source region estimating device according to (27), the surface shape defect source evaluation indices $\beta_{(mk)}$ and $\beta_{(m0)}$ may be the maximum values of a difference gradient obtained by dividing a difference in correction comparative stress between two elements separated from each other by the separation distance.

(31) According to a fifth aspect of the present invention, there is provided a program which performs the surface shape defect generating region estimating method according to (1).

(32) According to a sixth aspect of the present invention, there is provided a program which performs the surface shape defect source region estimating method according to (12).

(33) According to a seventh aspect of the present invention, there is provided a recording medium which is readable by a computer in which the program according to (31) is recorded.

(34) According to an eighth aspect of the present invention, there is provided a recording medium which is readable by a computer in which the program according to (32) is recorded.

Effects of the Invention

According to the present invention, it is possible to provide a method, a device, a program, and a recording medium, for estimating generating regions or source regions of a surface shape defect of a deformation-processed product generated when performing deformation processing with respect to a workpiece.

EMBODIMENTS OF THE INVENTION

First, an estimating method of wrinkle generating regions employed in the related art will be described.

Figure 16A:
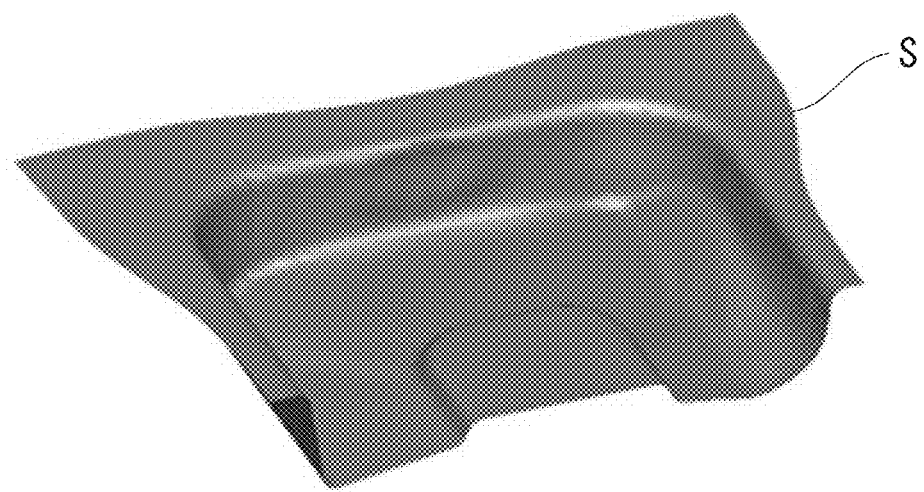
FIG. 16A is a view in which the steel sheet S is shaded at the first working point of time $T_1$.
Figure 16B:
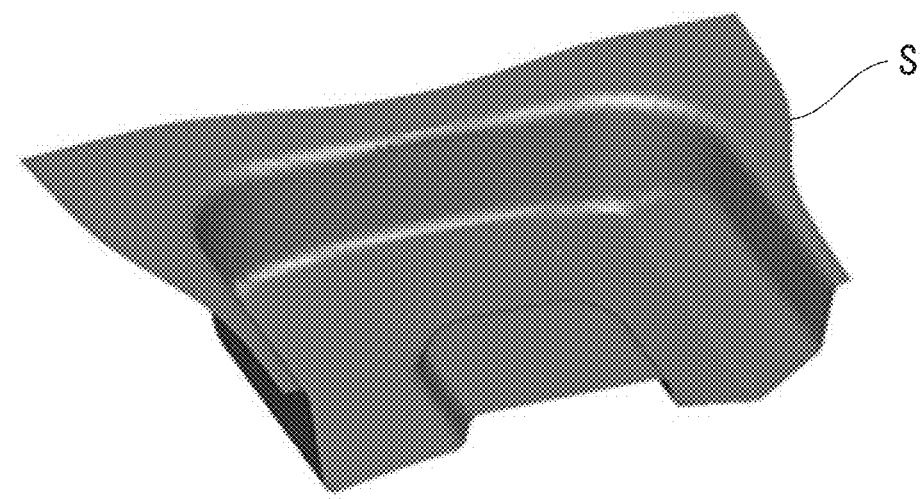
FIG. 16B is a view in which the steel sheet S is shaded at the second working point of time $T_2$.

In FIGS. 16A and 16B, shading views of a press-formed article (steel sheet S) to which press forming is performed by using a press die model of FIG. 1 which will be described later are illustrated. FIG. 16A is a shading view of the steel sheet S when an upper die 101 is in front of a bottom dead point by 5 millimeters, and FIG. 16B is a shading view of the steel sheet S when the upper die 101 is at the bottom dead point.

In FIG. 16A, a part at which light and shade are confirmed is a part at which the shape of the steel sheet S changes between a front part of a press and a front part of the bottom dead point by 5 millimeters. In other words, it is also possible to estimate that a bending portion which is an origin of wrinkles is generated at the part, but the part having the light and shade is merely a part at which the shape of the steel sheet S changes, can be estimated as the bending portion or can be estimated as the shape of a product.

Furthermore, as illustrated in FIG. 16B, from the shading view when the upper die 101 is at the bottom dead point, the light and shade are not clear, and it is difficult to estimate the wrinkle generating regions.

In other words, in the estimating method that uses the shading view as described above, there is a difficulty of quantitatively estimating the wrinkle generating regions. In particular, in a case where the shape of the product is complicated, it is extremely difficult to distinguish whether the part is the bending portion or the wrinkles, or the shape (design) to be processed, from the shading view.

In addition, as a method of acquiring stress distribution in the steel sheet, an analysis method of the press forming of the steel sheet that uses an FEM analysis method. In the analysis method, it is possible to acquire the stress distribution in the steel sheet by dividing the steel sheet into a plurality of finite elements and by estimating the stress for each of the finite elements. However, it is difficult to directly predict the wrinkle generating regions from the stress distribution. As the reason of generation of the stress distribution, various factors are considered in addition to the generation of wrinkles, and thus, the generation of the stress distribution is not necessarily linked to the generation of wrinkles.

The inventors have found that it is important to compare the stress distributions of the steel sheet at different processing points of time when predicting the generation of the wrinkles considering that the wrinkles generated in the steel sheet is likely to be generated as the work amount of the steel sheet increases and is likely to be generated the most immediately before the upper die reaches the bottom dead point.

Furthermore, the inventors have found that it is more important to compare the stress distribution of the steel sheet before reaching the bottom dead point and the stress distribution of the steel sheet after reaching the bottom dead point for accurately predicting the generation of the wrinkles, considering that the bending portion which is an origin of the wrinkles is pressed by the die, and as a result, the distribution of the stress is generated when the upper die reaches the bottom dead point and the press forming is finished.

Hereinafter, a surface shape defect generating region estimating method, a surface shape defect source region estimating method, a surface shape defect generating region estimating device, a surface shape defect source region estimating device, a program, and a recording medium according to the present invention which is based on the above-described knowledge, will be described in detail based on the embodiments.

Furthermore, in any of the embodiments, in order to describe the present invention to be easily understood, a case where numerical analysis is performed with respect to the press forming that uses a press die model which will be described later by a finite element method and wrinkle generating regions or wrinkle source regions are predicted with respect to a steel sheet S which is a 440 MPa-class cold rolled steel sheet S having a tensile strength of 462 MPa and a yield stress of 360 MPa as the workpiece, will be described as an example.

Figure 1:
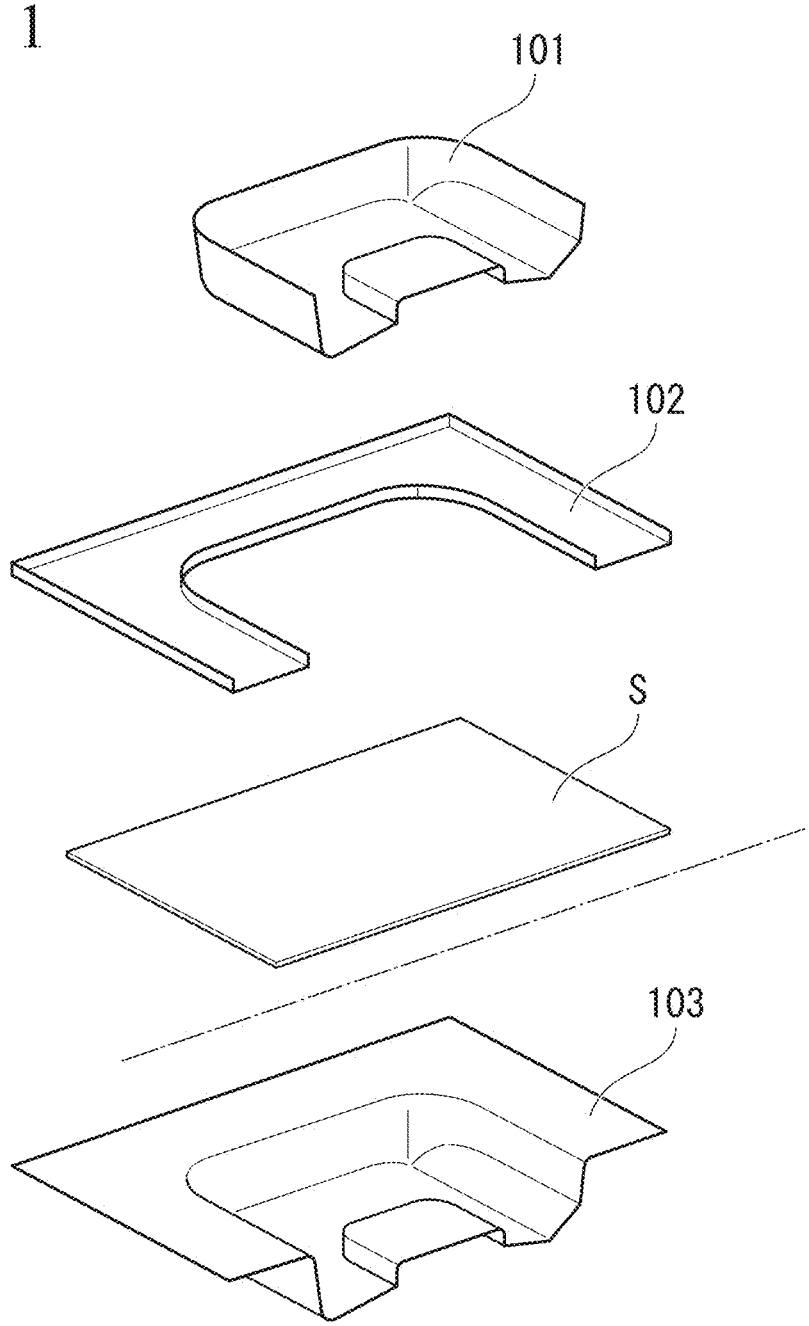
FIG. 1 is a schematic view illustrating a press die model which is used in numerical analysis of a surface shape defect generating region estimating method according to a first embodiment of the present invention and a surface shape defect source region estimating method according to a second embodiment of the present invention.

Specifically, the numerical analysis is performed by using the press die model including the upper die (punch) 101, a blank holder 102, and a lower die (die) 103 which are illustrated in FIG. 1. The press die model is a model for performing press forming by relatively lowering the upper die 101 in a state where the steel sheet S is put on the lower die 103, the blank holder 102 is lowered, and the steel sheet S is held between the lower die 103 and the blank holder 102.

In addition, in the specification,
(1) a point of time when plastic deformation of the workpiece starts is defined as a deformation processing starting point of time $T_{START}$,
(2) a point of time when the plastic deformation of the workpiece ends is defined as a deformation processing ending point of time $T_{END}$,
(3) a point of time after the deformation processing starting point of time $T_{START}$ and before deformation processing ending point of time $T_{END}$ is defined as a first working point of time $T_1$, and
(4) a point of time after the first working point of time $T_1$ and before or at the same time as deformation processing ending point of time $T_{END}$ is defined as a second working point of time $T_2$.

Furthermore, in the drawings which will be illustrated hereinafter, there is a case where the shape or the size and the dimension of illustrated members are different from practical dimension or the like of the members.

"Region" indicates a fine region configured of one or more of elements in the finite element method, or an aggregate in which the elements are continuous to each other.

First Embodiment

A first embodiment of the present invention is the surface shape defect generating region estimating method for estimating the wrinkle generating regions (surface shape defect generating regions) of a press-formed article (deformation-processed product) obtained by press-forming the steel sheet S from a starting point of time of the press forming (deformation processing starting point of time $T_{START}$) to an ending point of time of the press forming (deformation processing ending point of time $T_{END}$).

Figure 2:
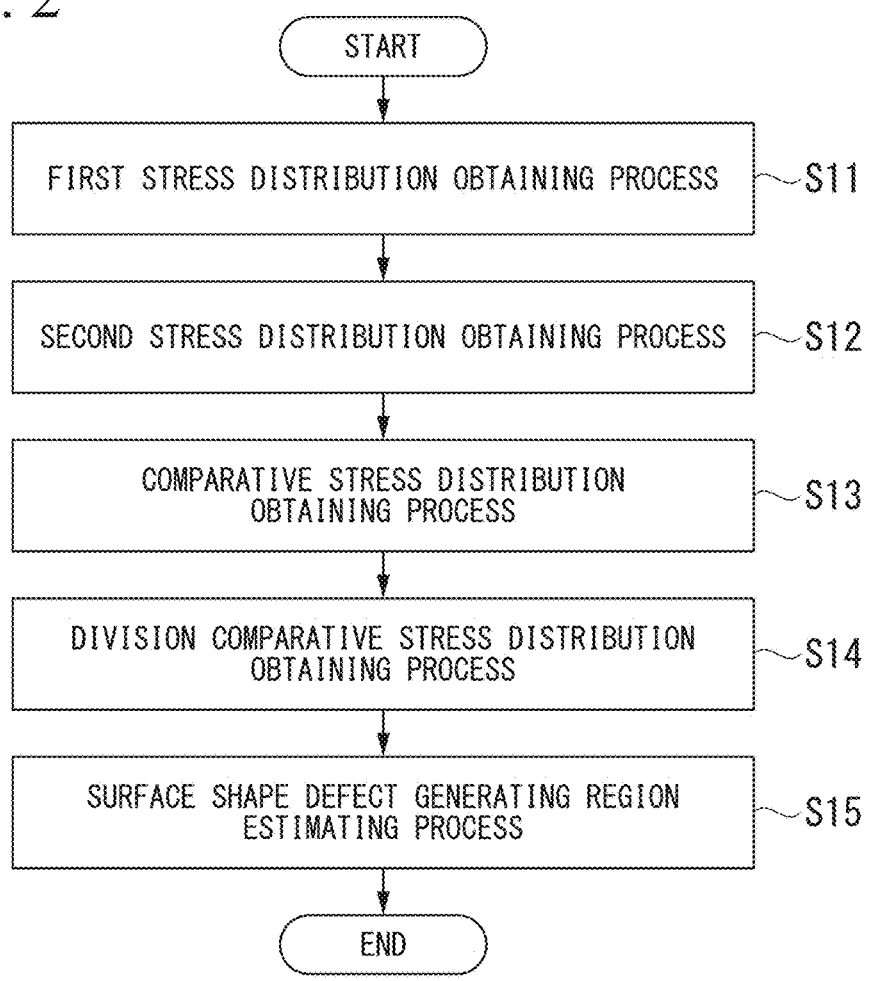
FIG. 2 is a flowchart illustrating a processing order of the surface shape defect generating region estimating method according to the first embodiment of the present invention.

As illustrated in FIG. 2, the surface shape defect generating region estimating method according to the embodiment includes a first stress distribution obtaining process S11, a second stress distribution obtaining process S12, a comparative stress distribution obtaining process S13, a division comparative stress distribution obtaining process S14, and a surface shape defect generating region estimating process S15.

Hereinafter, each process will be described in detail.
(First Stress Distribution Obtaining Process S11)
In the first stress distribution obtaining process S11, first stress distribution $\sigma_{(T1)}$ which is stress distribution at the first working point of time $T_1$ of the steel sheet S that is a target of the press forming is obtained by numerical analysis by the finite element method. Specifically, the first stress distribution $\sigma_{(T1)}$ is obtained by performing the numerical analysis according to the finite element method with respect to the stress distribution of the steel sheet S at the first working point of time $T_1$, that is, at the point of time after the upper die 101 comes into contact with the steel sheet S and deformation of the steel sheet S starts and before the upper die 101 reaches the bottom dead point.

Figure 3:
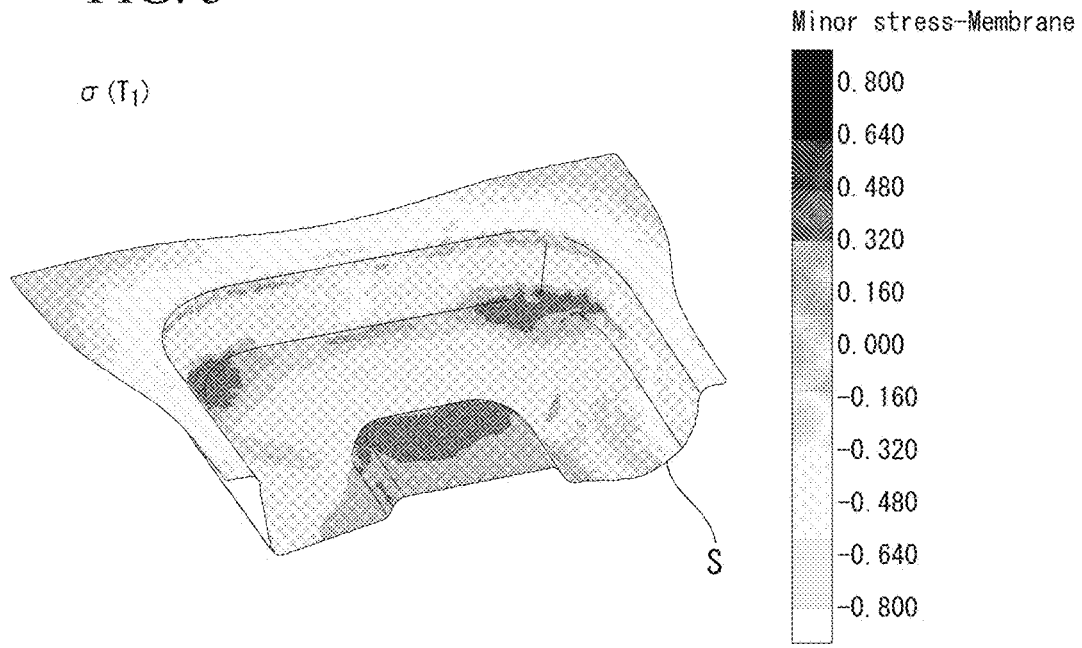
FIG. 3 is a contour view of first stress distribution $\sigma_{(T1)}$ of a steel sheet S at a first working point of time $T_1$.

In FIG. 3, the contour view (contour diagram) of the first stress distribution $\sigma_{(T1)}$ obtained according to the first stress distribution obtaining process S11 is illustrated.
(Second Stress Distribution Obtaining Process S12)
In the second stress distribution obtaining process S12, second stress distribution $\sigma_{(T2)}$ which is the stress distribution at a second working point of time $T_2$ of the steel sheet S which is a target of the press forming is obtained by the numerical analysis according to the finite element method. Specifically, the second stress distribution $\sigma_{(T2)}$ is obtained by performing the numerical analysis according to the finite element method with respect to the stress distribution of the steel sheet S at the second working point of time $T_2$, that is, at the point of time after the first working point of time $T_1$ and before or at the same time as the deformation processing ending point of time $T_{END}$.

Figure 4:
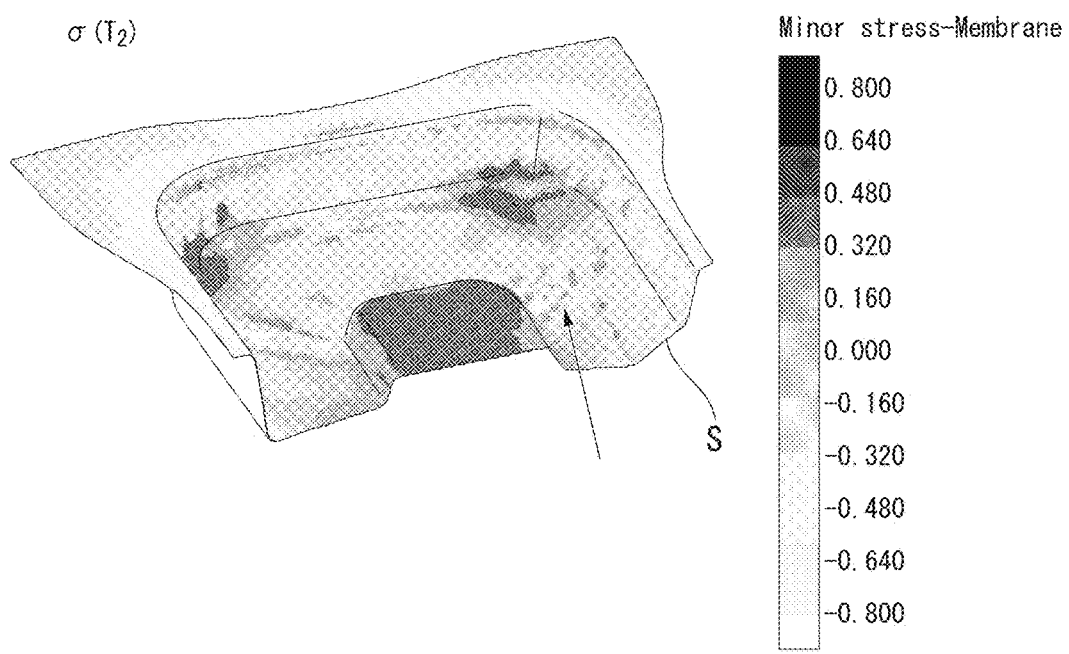
FIG. 4 is a contour view of second stress distribution $\sigma_{(T2)}$ of the steel sheet S at a second working point of time $T_2$.

In FIG. 4, a contour view of the second stress distribution $\sigma_{(T2)}$ obtained according to the second stress distribution obtaining process S12 is illustrated.

At the first working point of time $T_1$ and at the second working point of time $T_2$, as illustrated in FIGS. 3 and 4, a part at which a residual stress partially increases (for example, an arrow illustrated in FIG. 4) can be confirmed. The part is a part at which a working ratio is high and excessive forming is performed, and is a part at which a material flows in from the peripheral part. In other words, a possibility that the wrinkles (or bending portion) are generated at the part also cannot be denied, but similar to the estimating method according to the shading view of the related art, it is not possible to distinguish whether the part is the wrinkles or the shape (design) to be processed. In addition, even when it is estimated that the wrinkles are generated, it is difficult to quantitatively estimate the size or the like of the wrinkles.

In addition, the numerical analysis by the finite element method can be performed by using a commercial finite element method (FEM) analyzing system (for example, commercial software PAM-STAMP, LS-DYNA, Autoform, OPTRIS, ITAS-3D, ASU/P-FORM, ABAQUS, ANSYS, MARC, HYSTAMP, Hyperform, SIMEX, Fastform3D, and Quikstamp). By using the finite element method (FEM) analyzing systems, based on properties of the steel sheet, such as shape data (sheet thickness, length, or width) of the press-formed steel sheet S, a strength, or elongation, it is possible to set a forming condition, such as shape of a die (shape of a die and a punch, a curvature, and a lubricating condition), or pressing pressure (temperature or pressure), to perform press forming analysis, and to quantitatively estimate the stress distribution of a formed article after the press forming.

(Comparative Stress Distribution Obtaining Process S13)

In the comparative stress distribution obtaining process S13, based on comparison of the first stress distribution $\sigma_{(T1)}$ and the second stress distribution $\sigma_{(T2)}$, comparative stress distribution $\sigma_{(T1, T2)}$ which is distribution of a comparative stress of a first stress and a second stress is obtained.

More specifically, by comparing the first stress distribution $\sigma_{(T1)}$ and the second stress distribution $\sigma_{(T2)}$, and by acquiring a difference or a change ratio of the stress of each finite element, it is possible to obtain the comparative stress distribution $\sigma_{(T1, T2)}$.

Figure 5:
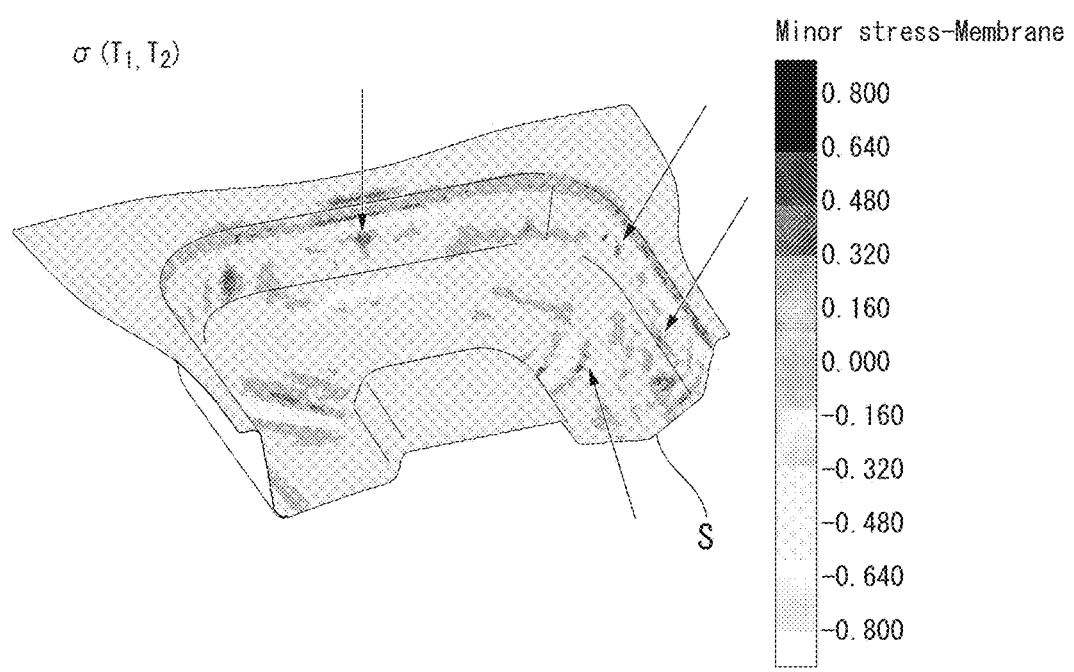
FIG. 5 is a contour view of comparative stress distribution $\sigma_{(T1, T2)}$ obtained based on a difference between the first stress distribution $\sigma_{(T1)}$ and the second stress distribution $\sigma_{(T2)}$.

In FIG. 5, a contour view of the comparative stress distribution $\sigma_{(T1, T2)}$ obtained according to the comparative stress distribution obtaining process S13 is illustrated.

Since the bending portion is pressed as the deformation processing advances, a compressive residual stress is generated at a part at which the wrinkles are generated and a tensile residual stress is generated at a part peripheral thereof. Therefore, as illustrated in FIG. 5, by calculating the difference or the change ratio of the stress value between the first stress distribution $\sigma_{(T1)}$ of the steel sheet S at the first working point of time $T_1$ and the second stress distribution $\sigma_{(T2)}$ of the steel sheet S at the second working point of time $T_2$ at which the deformation processing has further proceeded than the first working point of time $T_1$, and by displaying the result of calculation by the contour view, it is possible to clearly observe the part at which the wrinkles are generated (illustrated by an arrow in the drawing).

(Division Comparative Stress Distribution Obtaining Process S14)

In division comparative stress distribution obtaining process S14, by dividing the comparative stress distribution $\sigma_{(T1, T2)}$ into a plurality of divided regions $D_K$ (k=1, 2, 3, ... n), division comparative stress distribution $\sigma_{DIV(T1, T2)}$ which is distribution of comparative stress in each of the divided regions $D_K$ is obtained.

Figure 6:
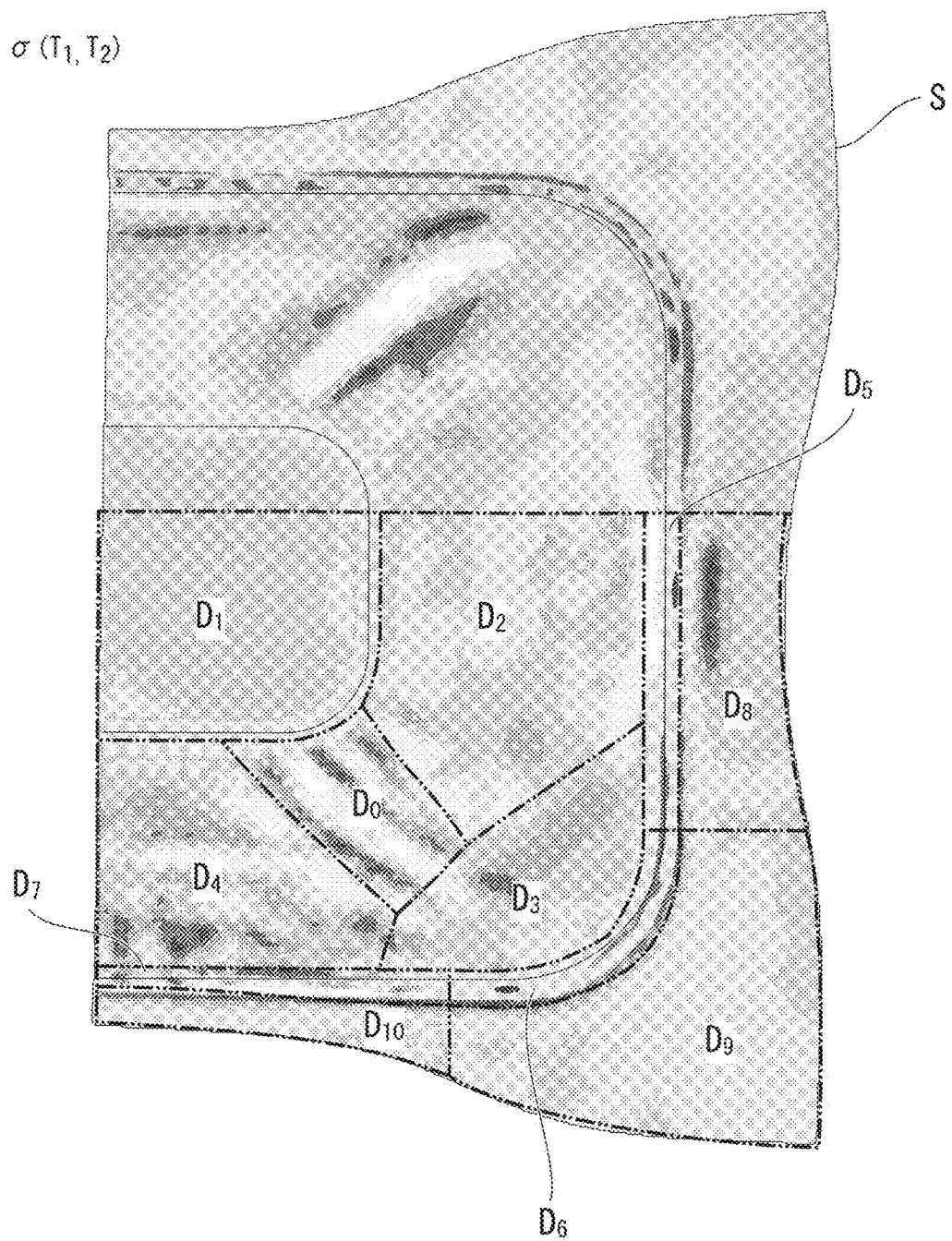
FIG. 6 is a view illustrating positions of divided regions $D_0$ to $D_{10}$ in the contour view of the comparative stress distribution $\sigma_{(T1, T2)}$ illustrated in FIG. 5.

In FIG. 6, an example of a case where the comparative stress distribution $\sigma_{(T1, T2)}$ is divided into divided regions $D_0$ to $D_{10}$ is illustrated.

Figure 7:
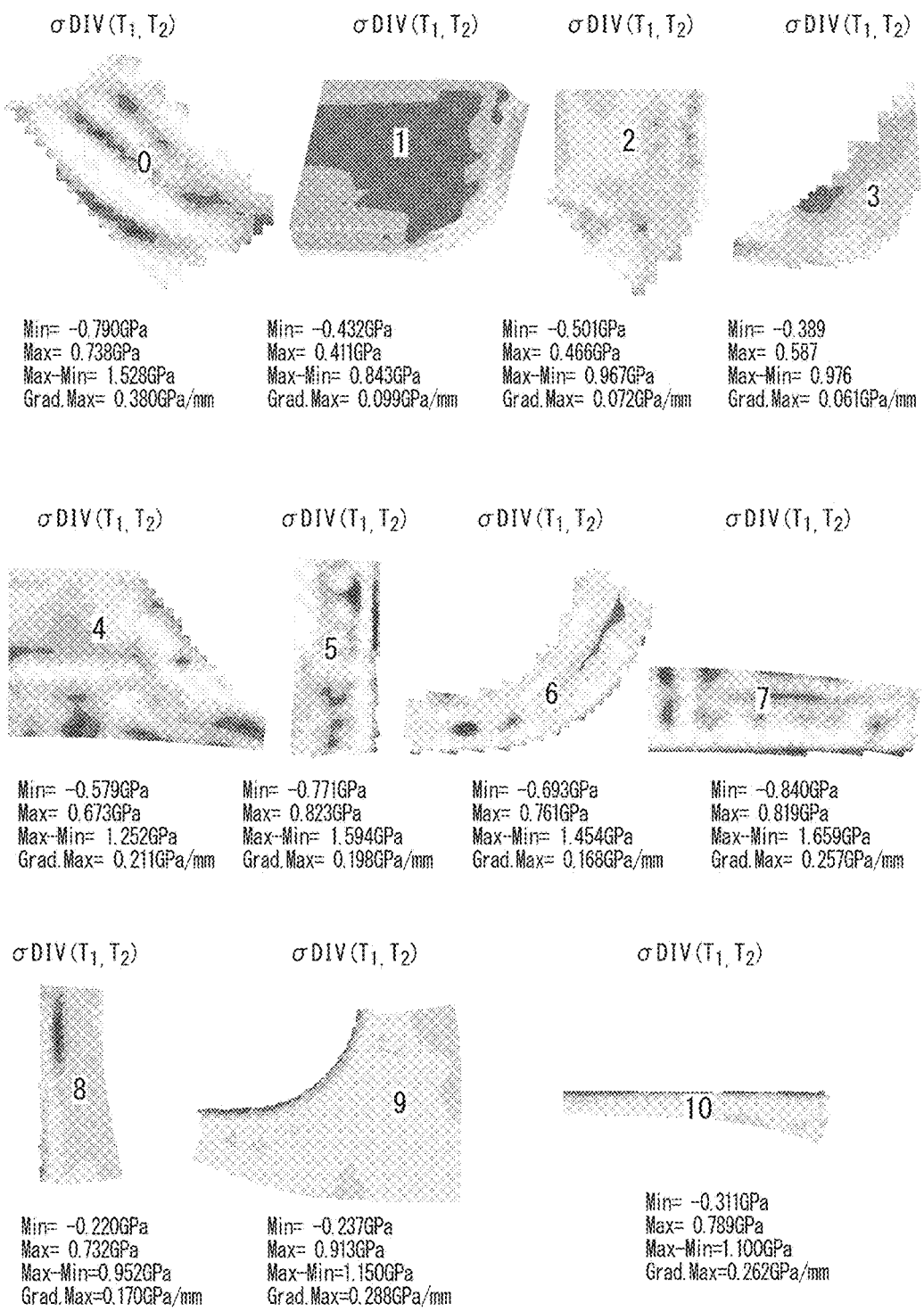
FIG. 7 is a view respectively illustrating division comparative stress distribution $\sigma_{DIV(T1, T2)}$ with respect to the divided regions $D_0$ to $D_{10}$ illustrated in FIG. 6.

In addition, in FIG. 7, the division comparative stress distribution $\sigma_{DIV(T1, T2)}$ of each of the divided regions $D_0$ to $D_{10}$ illustrated in FIG. 6 is illustrated.

Furthermore, in FIG. 7, Min indicates "minimum value of comparative stress (GPa)", Max indicates "maximum value of comparative stress (GPa)", Max-Min indicates "maximum value of difference in comparative stress between two elements separated from each other (GPa)", and Grad.Max indicates "maximum value of a difference gradient obtained by dividing the difference in comparative stress between two elements separated from each other by a separation distance (GPa/mm)".

Furthermore, a defining method of the divided region $D_K$ is not particularly limited, but the method which will be descried later may be used.

(Surface Shape Defect Generating Region Estimating Process S15)

In the surface shape defect generating region estimating process S15, by using the division comparative stress distribution $\sigma_{DIV(T1, T2)}$, based on a surface shape defect generation evaluation index $\alpha$ acquired with respect to each of the divided regions $D_K$, it is estimated whether or not each of the divided regions $D_K$ is the wrinkle generating region.

As the surface shape defect generation evaluation index $\alpha$, for example, the following evaluation index can be used.

Surface shape defect generation evaluation index $\alpha 1$: the minimum value of the comparative stress.

Surface shape defect generation evaluation index $\alpha 2$: the maximum value of the difference in comparative stress between two elements separated from each other.

Surface shape defect generation evaluation index $\alpha 3$: the maximum value of the difference gradient obtained by dividing the difference in comparative stress between two elements separated from each other by the separation distance.

(Surface Shape Defect Generation Evaluation Index $\alpha 1$)

In a case of using the surface shape defect generation evaluation index $\alpha 1$, the divided region $D_K$ in which the "minimum value of comparative stress" is smaller than a threshold value in each of the division comparative stress distributions $\sigma_{DIV(T1, T2)}$ is estimated as the wrinkle generating region.

The bending portion which is an origin of the wrinkles is generated at the first working point of time $T_1$, and after this, the bending portion is pressed as the forming proceeds. Therefore, at the second working point of time $T_2$, the compressive residual stress caused by the pressed bending portion (wrinkle) or the bending portion (wrinkle) which is being pressed is generated.

Therefore, in the divided region $D_K$ in which the compressive residual stress is large, it can be said that a possibility that the wrinkles are generated is high.

Due to this, it is possible to estimate the divided region $D_K$ in which the "minimum value of comparative stress" is smaller than the threshold value, as the wrinkle generating region.

To give a specific example, considering the value of "Min" illustrated in FIG. 7, for example, in a case where the threshold value is set to be −0.700 (GPa), it is possible to estimate the divided region $D_0$, the divided region $D_5$, and the divided region $D_7$, as the wrinkle generating regions.

The threshold value in a case of using the surface shape defect generation evaluation index $\alpha1$ may be determined by whether or not the wrinkle having any height is allowed in a final product (press-formed article). In other words, for example, in a case of the press-formed article used in a severer environment, since even a small wrinkle largely acts on the performance of the product, by setting the threshold value to be "low", it is possible to more strictly evaluate the generation of the wrinkles.

(Surface Shape Defect Generation Evaluation Index $\alpha2$)

In a case of using the surface shape defect generation evaluation index $\alpha2$, the divided region $D_K$ in which the "maximum value of the difference in comparative stress between two elements separated from each other" is greater than the threshold value in each of the division comparative stress distributions $\sigma_{DIV(T1,\ T2)}$ is estimated as the wrinkle generating regions.

As described above, the bending portion which is an origin of the wrinkles is generated at the first working point of time $T_1$, and after this, the bending portion is pressed as the forming proceeds, and at the second working point of time $T_2$, the compressive residual stress caused by the pressed bending portion (wrinkle) or the bending portion (wrinkle) which is being pressed is generated. Furthermore, around the compressive residual stress, the tensile residual stress is generated.

Therefore, in the divided region $D_K$ in which the difference between the maximum value and the minimum value of the residual stress is large, it can be said that a possibility that the wrinkles are generated is high.

Due to this, it is preferable to estimate the divided region $D_K$ in which the "maximum value of the difference in comparative stress between the two elements separated from each other" is greater than the threshold value, as the wrinkle generating region.

To give a specific example, considering the value of "Max−Min" illustrated in FIG. 7, for example, in a case where the threshold value is set to be 1.500 (GPa), it is possible to estimate the divided region $D_0$, the divided region $D_5$, and the divided region $D_7$, as the wrinkle generating regions.

The threshold value in a case of using the surface shape defect generation evaluation index $\alpha2$ may also be determined by whether or not the wrinkle having any height is allowed in a final product (press-formed article), similar to the surface shape defect generation evaluation index $\alpha1$. In a case of using the surface shape defect generation evaluation index $\alpha2$, by setting the threshold value to be "high", it is possible to more strictly evaluate the generation of the wrinkles.

Furthermore, in a case of using the surface shape defect generation evaluation index $\alpha2$, compared to a case of using the surface shape defect generation evaluation index $\alpha1$, the value of the tensile residual stress around the wrinkles is also considered, and thus, it is possible to more accurately estimate the wrinkle generating region than a case of using the surface shape defect generation evaluation index $\alpha1$.

(Surface Shape Defect Generation Evaluation Index $\alpha3$)

In a case of using the surface shape defect generation evaluation index $\alpha3$, the divided region $D_K$ in which the "maximum value of the difference gradient obtained by dividing the difference in comparative stress between two elements separated from each other by the separation distance" is greater than the threshold value in each of the division comparative stress distributions $\sigma_{DIV(T1,\ T2)}$ is estimated as the wrinkle generating regions.

As described above, in the divided region $D_K$ in which the difference between the maximum value and the minimum value of the residual stress is large, the possibility that the wrinkles are generated is high. However, according to the method of definition of the divided region $D_K$, there is a case where the plurality of wrinkle generating parts are included in one divided region $D_K$. In this case, there is a possibility that the difference of the maximum value of the residual stress caused by one wrinkle generating part and the minimum value of the residual stress caused by other wrinkle generating parts is calculated.

Therefore, in order to more reliably perform estimation of the wrinkle generating regions, it can be said that it is preferable to consider the difference of the compressive residual stress and the tensile residual stress which are caused by the "one" wrinkle generating part as the evaluation index.

Therefore, it is more preferable to estimate the divided region $D_K$ in which the "maximum value of the difference gradient obtained by dividing the difference in comparative stress between two elements separated from each other by the separation distance" is greater than the threshold value, as the wrinkle generating region.

To give a specific example, considering the value of "Grad.Max" illustrated in FIG. 7, for example, in a case where the threshold value is set to be 0.260 (GPa/mm), it is possible to estimate the divided region $D_0$, the divided region $D_9$, and the divided region $D_{10}$, as the wrinkle generating regions.

The threshold value in a case of using the surface shape defect generation evaluation index $\alpha3$ may also be determined by whether or not the wrinkle having any height is allowed in a final product (press-formed article), similar to the surface shape defect generation evaluation indices $\alpha1$ and $\alpha2$. In a case of using the surface shape defect generation evaluation index $\alpha3$, similar to the surface shape defect generation evaluation index $\alpha2$, by setting the threshold value to be "high", it is possible to more strictly evaluate the generation of the wrinkles.

Furthermore, in a case of using the surface shape defect generation evaluation index $\alpha3$, compared to a case of using the surface shape defect generation evaluation indices $\alpha1$ and $\alpha2$, the difference gradient is considered, and thus, it is possible to more accurately estimate the wrinkle generating region than a case of using the surface shape defect generation evaluation indices $\alpha1$ and $\alpha2$.

Furthermore, regarding the above-described division comparative stress distribution obtaining process S14, with respect to the defining method of the divided region $D_K$, automatically, equal division (for example, a shape of a dice) may be employed, or the method may be determined based on prediction of estimating a location at which the wrinkle is likely to be generated and the location at which the wrinkle is unlikely to be generated from an experience value.

However, in order to further increase accuracy, considering the above-described surface shape defect generation evaluation indices $\alpha1$ to $\alpha3$, the divided region $D_K$ may be defined as follows.

(Divided Region Defining Method 1)

In a divided region defining method 1, first, in the comparative stress distribution $\sigma_{(T1,\ T2)}$, the first divided region $D_1$ including "element of which the comparative stress is the minimum" is defined as one of the plurality of divided regions $D_K$.

In addition, in the comparative stress distribution $\sigma_{(T1, T2)}$ obtained by removing the first divided region $D_1$ from the comparative stress distribution $\sigma_{(T1, T2)}$, the second divided region $D_2$ including "element of which the comparative stress is the minimum" is defined as one of the plurality of divided regions $D_K$.

By repeating the similar defining method, it is possible to automatically define the divided region $D_K$. The number of times of repetition of the similar defining method is not particularly limited, but for example, the above-described method may be repeated until the "minimum value of comparative stress" in the comparative stress distribution $\sigma_{(T1, T2)}$ obtained by removing the defined divided region $D_K$ becomes two or more times the "minimum value of comparative stress" of the first divided region $D_1$.

(Divided Region Defining Method 2)

In a divided region defining method 2, first, in the comparative stress distribution $\sigma_{(T1, T2)}$, the first divided region $D_1$ including "two elements of a combination in which the difference in comparative stress between two elements separated from each other becomes the maximum" is defined as one of the plurality of divided regions $D_K$.

In addition, in the comparative stress distribution $\sigma_{(T1, T2)}$ obtained by removing the first divided region $D_1$ from the comparative stress distribution $\sigma_{(T1, T2)}$, the second divided region $D_2$ including "two elements of a combination in which the difference in comparative stress between two elements separated from each other becomes maximized" is defined as one of the plurality of divided regions $D_K$.

By repeating the similar defining method, it is possible to automatically define the divided region $D_K$. The number of times of repetition of the similar defining method is not particularly limited, but for example, the above-described method may be repeated until the "maximum value of difference in comparative stress between two elements separated from each other" in the comparative stress distribution $\sigma_{(T1, T2)}$ obtained by removing the defined divided region $D_K$ becomes 50% or less of the "maximum value of difference in comparative stress between two elements separated from each other" of the first divided region $D_1$.

(Divided Region Defining Method 3)

In a divided region defining method 3, first, in the comparative stress distribution $\sigma_{(T1, T2)}$, the first divided region $D_1$ including "two elements of a combination in which the difference gradient obtained by dividing the difference in comparative stress between two elements separated from each other by the separation distance becomes maximized" is defined as one of the plurality of divided regions $D_K$.

In addition, in the comparative stress distribution $\sigma_{(T1, T2)}$ obtained by removing the first divided region $D_1$ from the comparative stress distribution $\sigma_{(T1, T2)}$, the second divided region $D_2$ including "two elements of a combination in which the difference gradient obtained by dividing the difference in comparative stress between two elements separated from each other by the separation distance becomes maximized" is defined as one of the plurality of divided regions $D_K$.

By repeating the similar defining method, it is possible to automatically define the divided region $D_K$. The number of times of repetition of the similar defining method is not particularly limited, but for example, the above-described method may be repeated until the "maximum value of the difference gradient obtained by dividing the difference in comparative stress between two elements separated from each other by the separation distance" in the comparative stress distribution $\sigma_{(T1, T2)}$ obtained by removing the defined divided region $D_K$ becomes 50% or less of the "maximum value of the difference gradient obtained by dividing the difference in comparative stress between two elements separated from each other by the separation distance" of the first divided region $D_1$.

Furthermore, the divided region defining method 1 is a method which considers the surface shape defect generation evaluation index $\alpha 1$, the divided region defining method 2 is a method which considers the surface shape defect generation evaluation index $\alpha 2$, and the divided region defining method 3 is a method which considers the surface shape defect generation evaluation index $\alpha 3$. Therefore, in a case of defining the divided region by using the divided region defining method 1, it is preferable to use the surface shape defect generation evaluation index $\alpha 1$.

Furthermore, in the embodiment, the first working point of time $T_1$ may be appropriately determined based on the shape of the press-formed steel sheet S, the properties of the steel sheet, the shape of a die, and press condition. For example, the first working point of time $T_1$ may be a working point of time at which the separation distance from the bottom dead point of the upper die 101 becomes more than 0 mm and 5 mm or less, or may be a working point of time at which the separation distance from the bottom dead point of the upper die 101 becomes a height that is 1 to 5 times the height of the wrinkles allowed for each part of the press-formed article.

In addition, it is preferable that the second working point of time $T_2$ is a working point of time at which the upper die 101 becomes the bottom dead point, that is, the deformation processing ending point of time $T_{END}$.

According to each of the steps described above, it is possible to quantitatively estimate the wrinkle generating regions of the press-formed article, and to reduce the number of processes or costs at the planning stage of investigating the forming method of the press-formed article.

Second Embodiment

A second embodiment of the present invention is a surface shape defect source region estimating method for estimating the source regions of the wrinkle generating regions estimated by the above-described "surface shape defect generating region estimating method".

Figure 8:
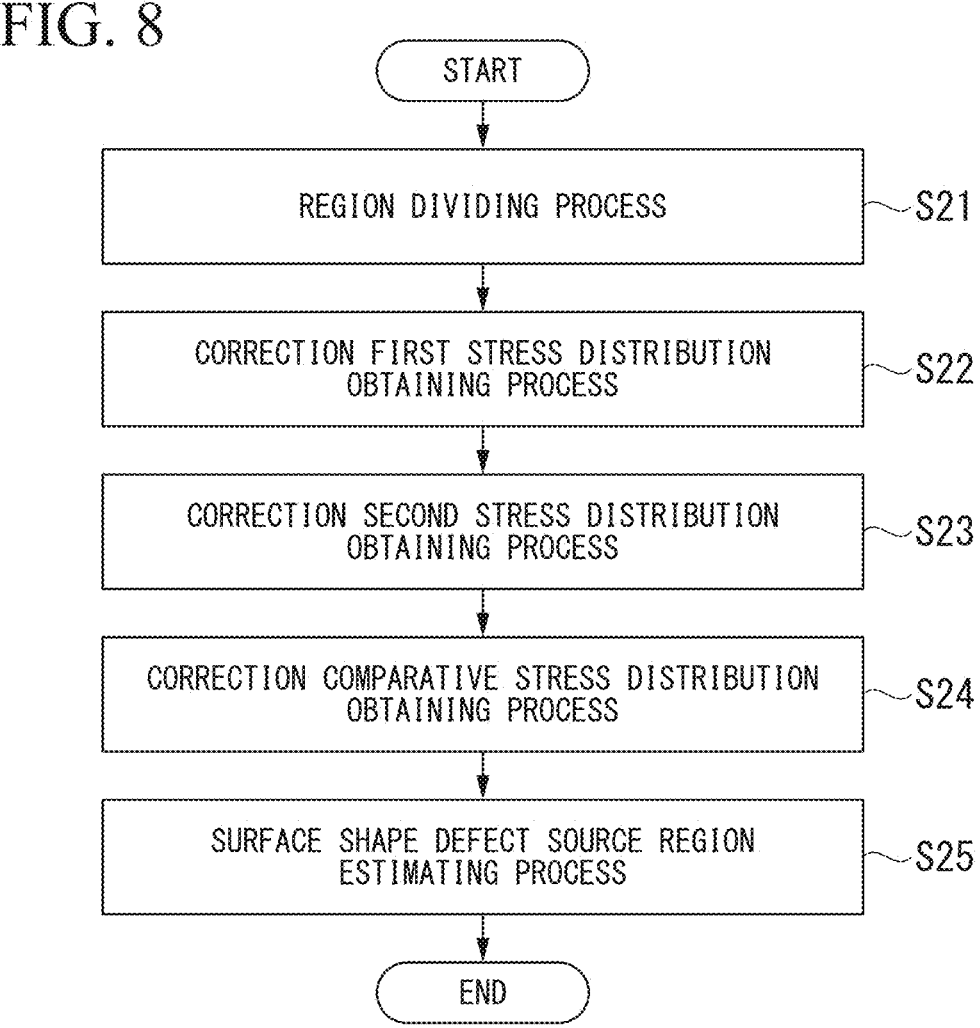
FIG. 8 is a flowchart illustrating a processing order of a surface shape defect source region estimating method according to a second embodiment of the present invention.
Figure 9:
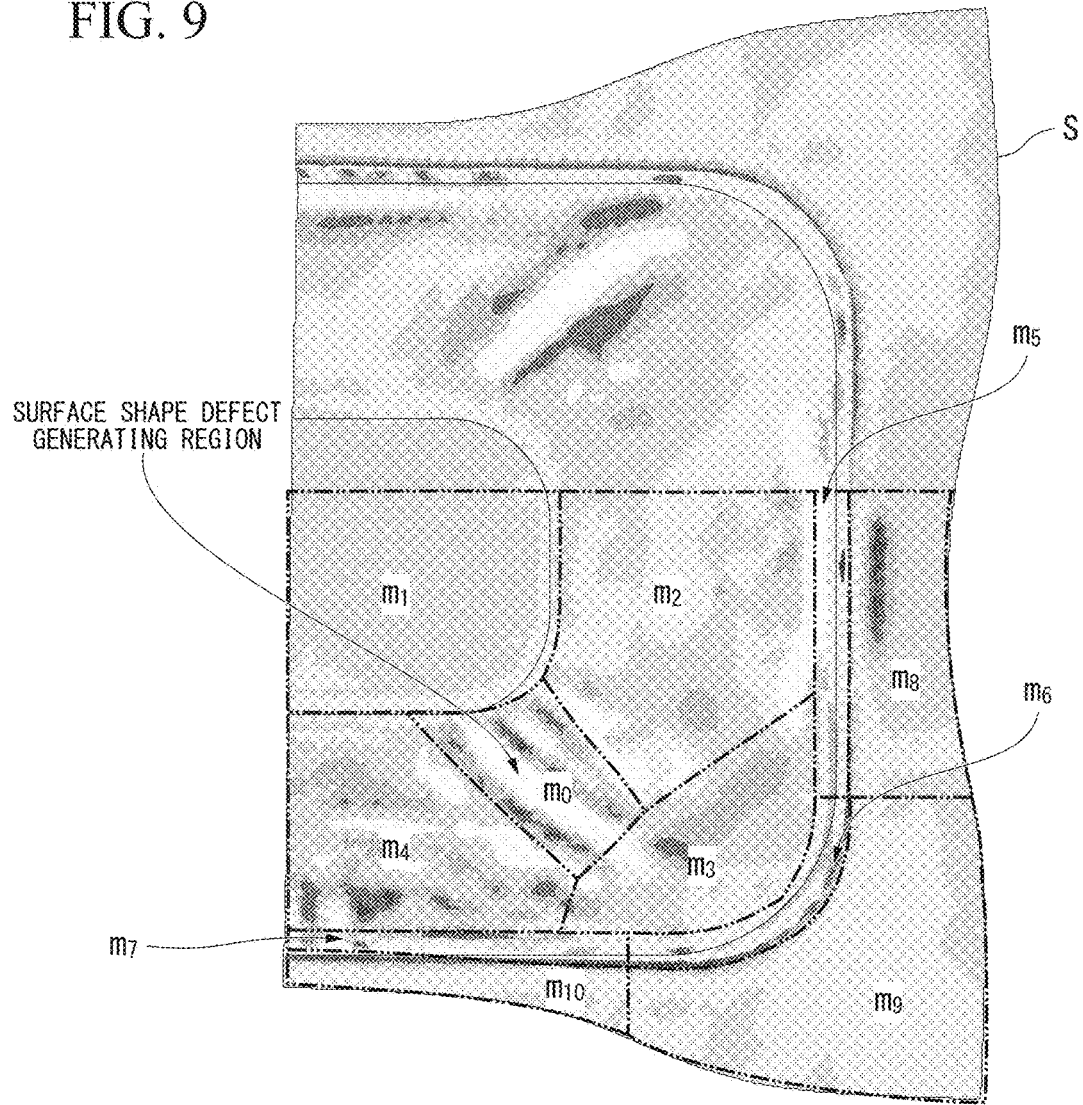
FIG. 9 is a view in which the divided region $D_0$ estimated as a surface shape defect generating region is specified as a reference region $m_0$, and the periphery thereof is divided into peripheral regions $m_1$ to $m_{10}$.

As illustrated in FIG. 8, the surface shape defect source region estimating method according to the embodiment includes a region dividing process S21, a correction first stress distribution obtaining process S22, a correction second stress distribution obtaining process S23, a correction comparative stress distribution obtaining process S24, and a surface shape defect source region estimating process S25.

Hereinafter, each process will be described in detail.

(Region Dividing Process S21)

In the region dividing process S21, one of the wrinkle generating regions estimated by the above-described "surface shape defect generating region estimating method" is specified as a reference region $m_0$, and the periphery of the reference region $m_0$ is divided into a plurality of peripheral regions $m_k$ (k=1, 2, 3, . . . n).

Hereinafter, a specific example will be described based on a case where the divided region $D_0$ illustrated in FIG. 6 is specified as the reference region $m_0$ and the periphery thereof is divided into peripheral regions $m_1$ to $m_{10}$.

Furthermore, in the example, similar to the divided regions $D_1$ to $D_{10}$ illustrated in FIG. 6, the peripheral regions m to $m_{10}$ are defined, but the defining method of the peripheral region $m_k$ is not particularly limited, and automatically, equal division (for example, a shape of a dice) may be employed, or the method may be determined based on prediction of estimating a location at which the wrinkle is likely to be generated and the location at which the wrinkle is unlikely to be generated from an experience value. In addition, the peripheral region $m_k$ may be defined along the divided region defining methods 1 to 3 described in the above-described first embodiment.

Furthermore, by finely defining the region of the peripheral region $m_k$ in the vicinity of the wrinkle generating region (by limiting the finite element to be small), it is possible to accurately estimate the wrinkle source regions.

(Correction First Stress Distribution Obtaining Process S22)

In the correction first stress distribution obtaining process S22, in the first stress distribution $\sigma_{(T1)}$ of the steel sheet S at the first working point of time $T_1$, correction first stress distribution $\sigma'_{(T1)}$ which is stress distribution in a case of changing a stress value of the arbitrary peripheral region $m_k$ to 0 in each of the peripheral regions $m_k$, is obtained for each of the peripheral regions $m_k$.

Furthermore, "correction first stress distribution $\sigma'_{(T1)}$ of the peripheral region $m_1$" means the correction first stress distribution $\sigma'_{(T1)}$ obtained by changing the stress with respect to the peripheral region $m_1$. Similarly, "correction first stress distribution $\sigma'_{(T1)}$ of the peripheral region $m_2$" means the correction first stress distribution $\sigma'_{(T1)}$ obtained by changing the stress with respect to the peripheral region $m_2$. In the embodiment, since ten peripheral regions $m_1$ to $m_{10}$ exist, ten correction first stress distributions $\sigma'_{(T1)}$ are obtained.

Figure 10:
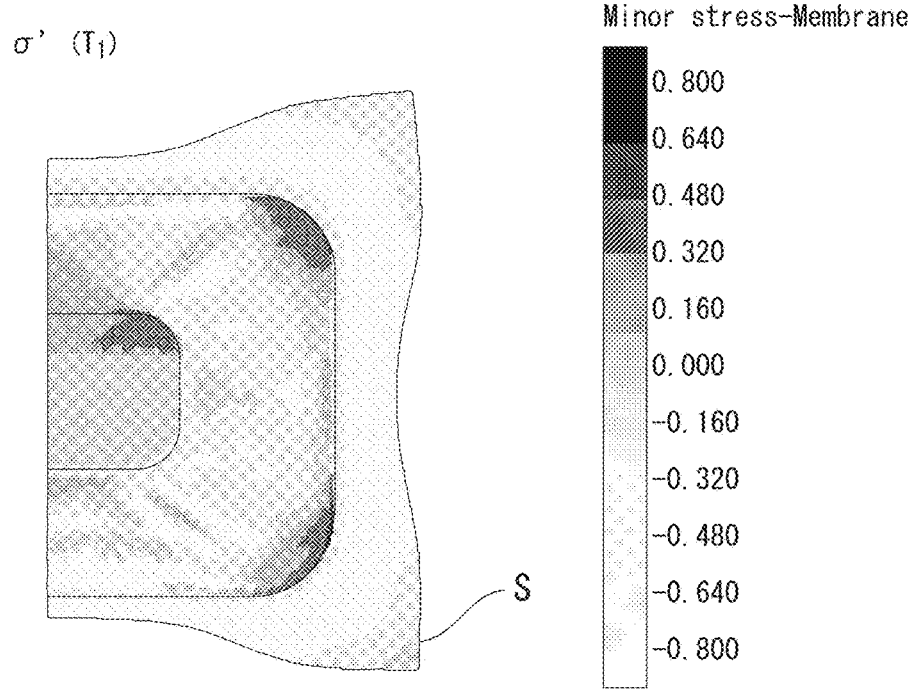
FIG. 10 is a contour view of correction first stress distribution $\sigma'_{(T1)}$ obtained by approximating a stress value of the peripheral region $m_1$ to 0 in the first stress distribution $\sigma_{(T1)}$.

In FIG. 10, a contour view of the correction first stress distribution $\sigma'_{(T1)}$ of the peripheral region $m_1$ obtained by changing the stress value of the peripheral region $m_1$ to 0 is illustrated.

Furthermore, in the embodiment, the stress value is changed to 0 with respect to each of the peripheral regions $m_1$ to $m_{10}$, but the stress value may be a predetermined value other than 0, and for example, may be changed to a value approximated to 0. In addition, for example, the stress value may be changed to 10 times the maximum value of the comparative stress value, or may be changed to 1/10 times the comparative stress value. Furthermore, the comparative stress value of each element of the peripheral region $m_k$ may be increased or reduced at a constant magnification. Although will be described later, by changing the comparative stress value of each element of the peripheral region $m_k$ in this manner, it is possible to verify a degree of influence on the stress value of the reference region $m_0$ according to the change.

(Correction Second Stress Distribution Obtaining Process S23)

In the correction second stress distribution obtaining process S23, correction second stress distribution $\sigma'_{(T2)}$ which is stress distribution obtained by performing forming analysis by the finite element method to the second working point of time $T_2$ based on the correction first stress distribution $\sigma'_{(T1)}$ is obtained for each of the peripheral regions $m_k$. In other words, by continuing the numerical analysis from the stress state where the stress value of each of the peripheral regions $m_k$ is changed to the predetermined value, and by performing analysis until reaching the second working point of time $T_2$, the correction second stress distribution $\sigma'_{(T2)}$ for each of the peripheral regions $m_k$ is obtained.

Furthermore, "correction second stress distribution $\sigma'_{(T2)}$ of the peripheral region $m_1$" means the correction second stress distribution $\sigma'_{(T2)}$ obtained by performing the forming analysis by the finite element method to the second working point of time $T_2$ based on the correction first stress distribution $\sigma'_{(T1)}$ of the peripheral region $m_1$. Similarly, "correction second stress distribution $\sigma'_{(T2)}$ of the peripheral region $m_2$" means the correction second stress distribution $\sigma'_{(T2)}$ obtained by performing the forming analysis by the finite element method to the second working point of time $T_2$ based on the correction first stress distribution $\sigma'_{(T1)}$ of the peripheral region $m_2$. In the embodiment, since ten peripheral regions $m_1$ to $m_{10}$ exist, ten correction second stress distributions $\sigma'_{(T1)}$ are obtained.

Figure 11:
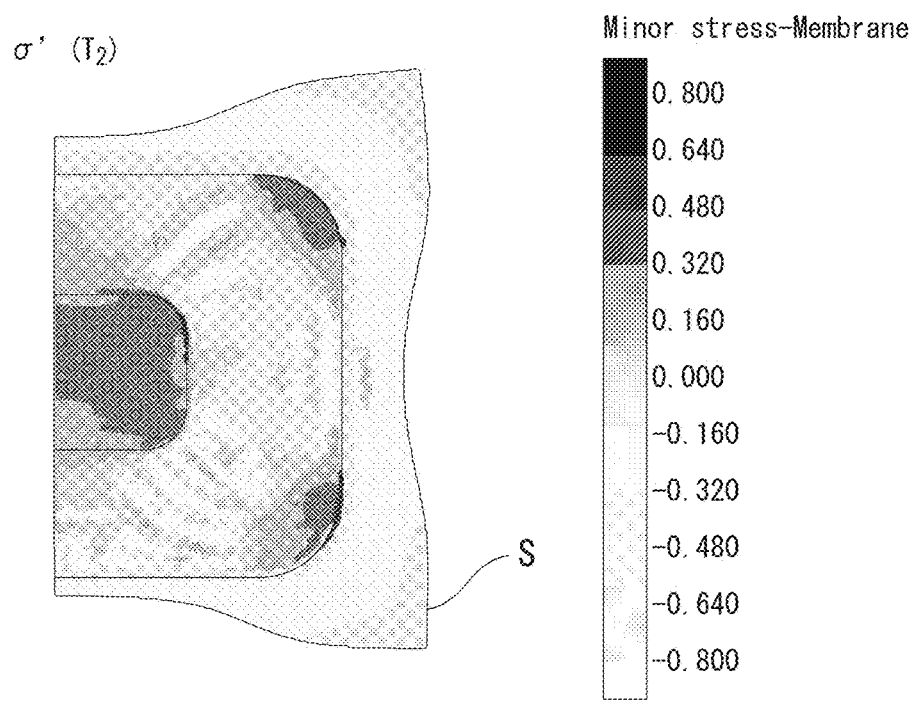
FIG. 11 is a contour view of correction second stress distribution $\sigma'_{(T2)}$ obtained by continuing forming analysis from a state of the correction first stress distribution $\sigma'_{(T1)}$ illustrated in FIG. 10 to a second working point of time $T_2$.

In FIG. 11, a contour view of the correction second stress distribution $\sigma'_{(T2)}$ of the peripheral region $m_1$ obtained by performing the forming analysis by the finite element method to the second working point of time $T_2$ based on the correction first stress distribution $\sigma'_{(T1)}$ of the peripheral region $m_1$ illustrated in FIG. 10, is illustrated.

(Correction Comparative Stress Distribution Obtaining Process S24)

In the correction comparative stress distribution obtaining process S24, correction comparative stress distribution $\sigma'_{(T1, T2)}$ which is distribution of the correction comparative stress obtained based on comparison of the correction first stress distribution $\sigma'_{(T1)}$ obtained in the correction first stress distribution obtaining process S22 and the correction second stress distribution $\sigma'_{(T2)}$ obtained in the correction second stress distribution obtaining process S23, is obtained for each of the peripheral regions $m_k$.

More specifically, by comparing the correction first stress distribution $\sigma'_{(T1)}$ of each of the peripheral regions $m_k$ and the correction second stress distribution $\sigma'_{(T2)}$, and by acquiring the difference or a change ratio of the stress for each of the finite elements, it is possible to obtain the correction comparative stress distribution $\sigma'_{(T1, T2)}$.

Furthermore, "correction comparative stress distribution $\sigma'_{(T1, T2)}$ of the peripheral region $m_1$" means the correction comparative stress distribution $\sigma'_{(T1, T2)}$ obtained based on comparison of the correction first stress distribution $\sigma'_{(T1)}$ of the peripheral region $m_1$ and the correction second stress distribution $\sigma'_{(T2)}$ of the peripheral region $m_1$. Similarly, "correction comparative stress distribution $\sigma'_{(T1, T2)}$ of the peripheral region $m_2$" means the correction comparative stress distribution $\sigma'_{(T1, T2)}$ obtained based on comparison of the correction first stress distribution $\sigma'_{(T1)}$ of the peripheral region $m_2$ and the correction second stress distribution $\sigma'_{(T2)}$ of the peripheral region $m_2$. In the embodiment, since ten peripheral regions $m_1$ to $m_{10}$ exist, ten correction comparative stress distributions $\sigma'_{(T1, T2)}$ are obtained.

Figure 12:
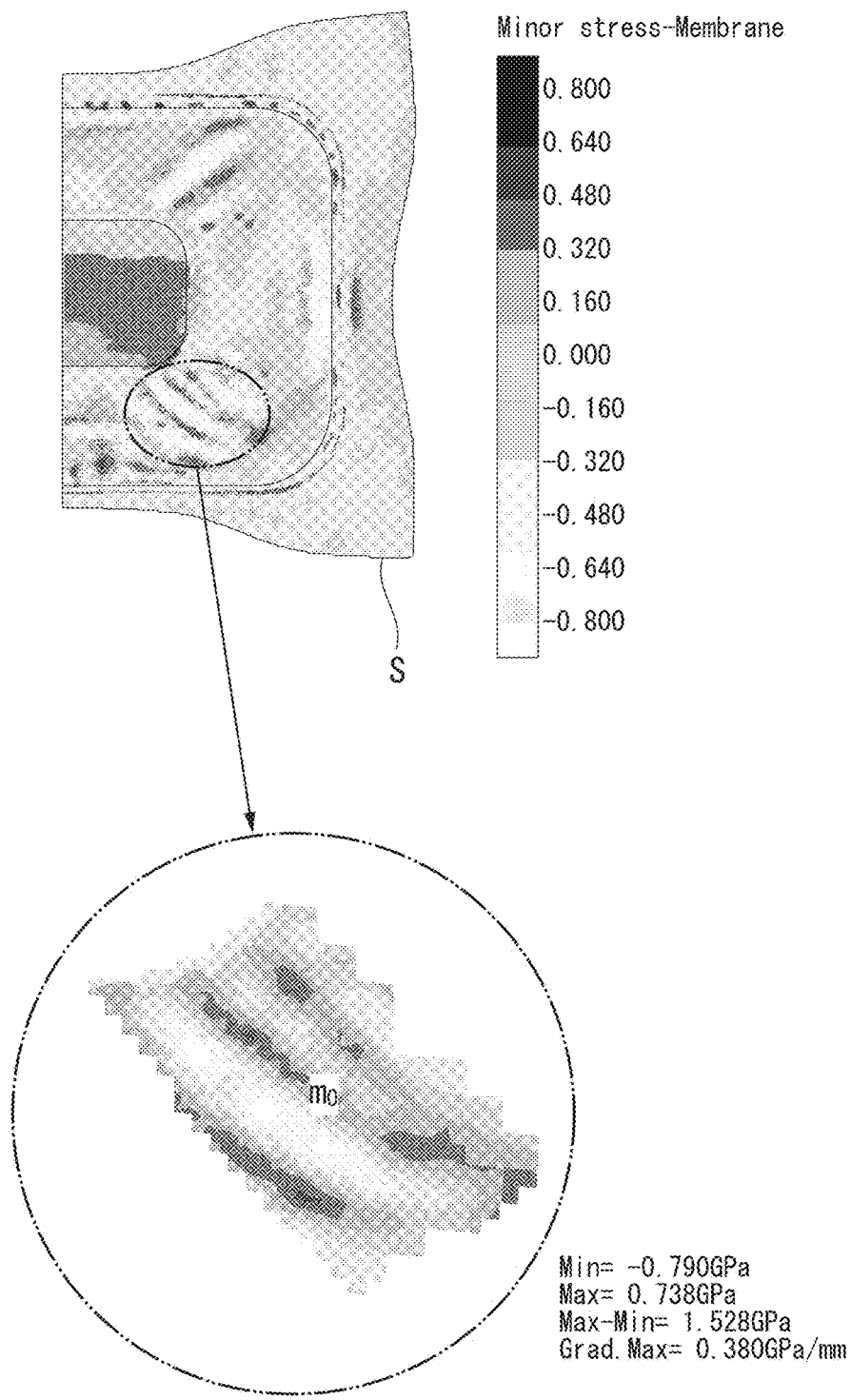
FIG. 12 is a contour view of correction comparative stress distribution $\sigma'_{(T1, T2)}$ obtained based on a difference between the correction first stress distribution $\sigma'_{(T1)}$ and the correction second stress distribution $\sigma'_{(T2)}$.

In FIG. 12, a contour view of the correction comparative stress distribution $\sigma'_{(T1, T2)}$ of the peripheral region m obtained by comparing the correction first stress distribution $\sigma'_{(T1)}$ of the peripheral region $m_1$ illustrated in FIG. 10 and the correction second stress distribution $\sigma'_{(T2)}$ of the peripheral region $m_1$ illustrated in FIG. 11, and by acquiring the difference in correction comparative stress of each of the finite elements, is illustrated. In FIG. 12, the following data in the reference region $m_0$ of the correction comparative stress distribution $\sigma'_{(T1, T2)}$ of the peripheral region $m_1$ is illustrated.

Min: "minimum value of correction comparative stress (GPa)"

Max: "maximum value of correction comparative stress (GPa)"

Max-Min: "maximum value of difference in correction comparative stress between two elements separated from each other (GPa)"

Grad.Max: "maximum value of a difference gradient obtained by dividing the difference in correction comparative stress between two elements separated from each other by a separation distance (GPa/mm)"

(Surface Shape Defect Source Region Estimating Process S25)

In the surface shape defect source region estimating process S25, it is estimated whether or not each of the peripheral regions $m_k$ is the wrinkle source region, based on a comparative value $\beta_{(mk, m0)}$ of a value of a surface shape defect source evaluation index $\beta_{(mk)}$ of the reference region $m_0$ in the correction comparative stress distribution $\sigma'_{(T1, T2)}$ of the peripheral region $m_k$ and a value of the surface shape defect source evaluation index $\beta_{(m0)}$ of the reference region $m_0$ in the comparative stress distribution $\sigma_{(T1, T2)}$.

In the embodiment, since ten peripheral regions $m_1$ to $m_{10}$ exist, the value of the surface shape defect source evaluation index $\beta_{(mk)}$ is obtained with respect to each of ten peripheral regions.

It is preferable that "surface shape defect source evaluation index $\beta_{(m0)}$" and "surface shape defect source evaluation index $\beta_{(mk)}$" are the same type of surface shape defect source evaluation index. As the type of the surface shape defect source evaluation index, "minimum value of the correction comparative stress", "maximum value of difference in correction comparative stress between two elements separated from each other", or "maximum value of difference gradient obtained by dividing the difference in correction comparative stress between two elements separated from each other by the separation distance" can be used.

The comparative value $\beta_{(mk, m0)}$ may be a value of a difference or a change ratio of the "value of the surface shape defect source evaluation index $\beta_{(mk)}$ of the reference region $m_0$ in the correction comparative stress distribution $\sigma'_{(T1, T2)}$ of the peripheral region $m_k$" and the "value of the surface shape defect source evaluation index $\beta_{(m0)}$ of the reference region $m_0$ in the comparative stress distribution $\sigma_{(T1, T2)}$".

In addition, the peripheral region $m_k$ is estimated as the wrinkle source region based on whether the comparative value is larger or smaller than the predetermined threshold value.

Furthermore, with respect to the peripheral region $m_k$ estimated as the wrinkle source region, it is possible to execute a countermeasure for wrinkle generation by installing a pad to a corresponding location of a die, by changing the material planning, and by changing a die in which the wrinkle generation is expected.

Hereinafter, a case where the "maximum value of the difference in correction comparative stress between two elements separated from each other" is used as the surface shape defect source evaluation indices $\beta_{(m0)}$ and $\beta_{(mk)}$ will be described as an example.

In Table 1, values of Min, Max, and Max−Min with respect to each of the peripheral regions $m_1$ to $m_{10}$ are illustrated. For example, a field of a row of Max of a column of m1 means the maximum value (GPa) of the correction comparative stress of the reference region $m_0$ in the correction comparative stress distribution $\sigma'_{(T1, T2)}$ of the peripheral region $m_1$.

Comparative values are further illustrated in Table 1. Here, since the "maximum value of the difference in comparative stress between two elements separated from each other" is used as the surface shape defect source evaluation indices $\beta_{(m0)}$ and $\beta_{(mk)}$, a value obtained by dividing (1) the "maximum value of the difference in comparative stress between two elements separated from each other" of the reference region $m_0$ in the correction comparative stress distribution $\sigma'_{(T1, T2)}$ of the peripheral region $m_k$ by (2) the "maximum value of the difference in comparative stress between two elements separated from each other" of the reference region $m_0$ in the comparative stress distribution $\sigma_{(T1, T2)}$ (=1.528 GPa), is calculated as a change ratio.

Furthermore, here, the change ratio of both of the values is considered as the comparative value, but the difference may be considered as the comparative value.

TABLE 1

| Peripheral region | $m_1$ | $m_2$ | $m_3$ | $m_4$ | $m_5$ | $m_6$ | $m_7$ | $m_8$ | $m_9$ | $m_{10}$ |
|---|---|---|---|---|---|---|---|---|---|---|
| MAX (GPa) | 0.738 | 0.863 | 0.828 | 0.81 | 0.792 | 0.825 | 0.768 | 0.835 | 0.806 | 0.802 |
| Min (GPa) | −0.79 | −0.831 | −0.778 | −0.755 | −0.791 | −0.788 | −0.769 | −0.784 | −0.793 | −0.79 |
| Max-Min (GPa) | 1.528 | 1.694 | 1.606 | 1.565 | 1.583 | 1.613 | 1.537 | 1.619 | 1.599 | 1.592 |
| Comparative value | 1.528/ 1.528 | 1.694/ 1.528 | 1.606/ 1.528 | 1.565/ 1.528 | 1.583/ 1.528 | 1.613/ 1.528 | 1.537/ 1.528 | 1.619/ 1.528 | 1.599/ 1.528 | 1.592/ 1.528 |
| Change ratio | 1.00 | 1.11 | 1.05 | 1.02 | 1.04 | 1.06 | 1.01 | 1.06 | 1.05 | 1.04 |

In addition, the peripheral region $m_k$ in which the comparative value (change ratio) is greater than the threshold value is estimated as the wrinkle source region. For example, in a case of setting the threshold value to be 1.10 (110%), the peripheral region $m_2$ is estimated as the wrinkle source region.

In addition, similar to the first embodiment, the "threshold value" which is an evaluation reference for estimating the wrinkle source region may be determined by whether or not the wrinkle having any height is allowed in a final product (press-formed article).

As described above, in the surface shape defect source region estimating method according to the embodiment, it is possible to quantitatively evaluate how much the peripheral region $m_k$ of which the stress is changed to the predetermined value influences the wrinkle generating region, by paying attention to the variation of the residual stress of the reference region $m_0$ including the wrinkle generation part at the second working point of time $T_2$, and to estimate which peripheral region $m_k$ is the wrinkle source region of the press-formed article. As a result, it is possible to quantitatively estimate the wrinkle source region of the press-formed article, and to reduce the number of processes or costs at the planning stage of investigating the forming method of the press-formed article.

Third Embodiment

A third embodiment of the present invention is a surface shape defect generating region estimating device 10 which estimates the wrinkle generating regions (surface shape defect generating region) of the press-formed article (deformation-processed product) obtained by press-forming the steel sheet from the point of time at which the press forming is started (deformation processing starting point of time $T_{START}$) until reaching the point of time at which the press forming ends (deformation processing ending point of time $T_{END}$).

Figure 13:
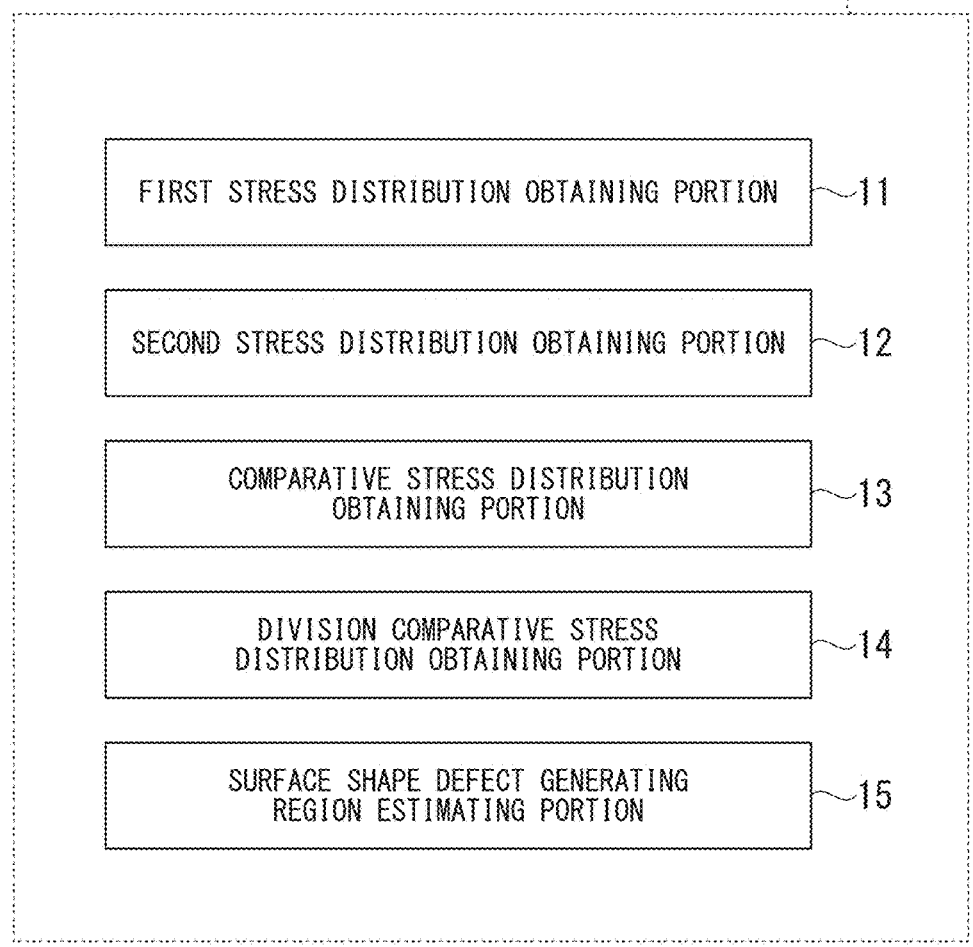
FIG. 13 is a schematic view illustrating a surface shape defect generating region estimating device 10 according to a third embodiment of the present invention.
Figure 14:
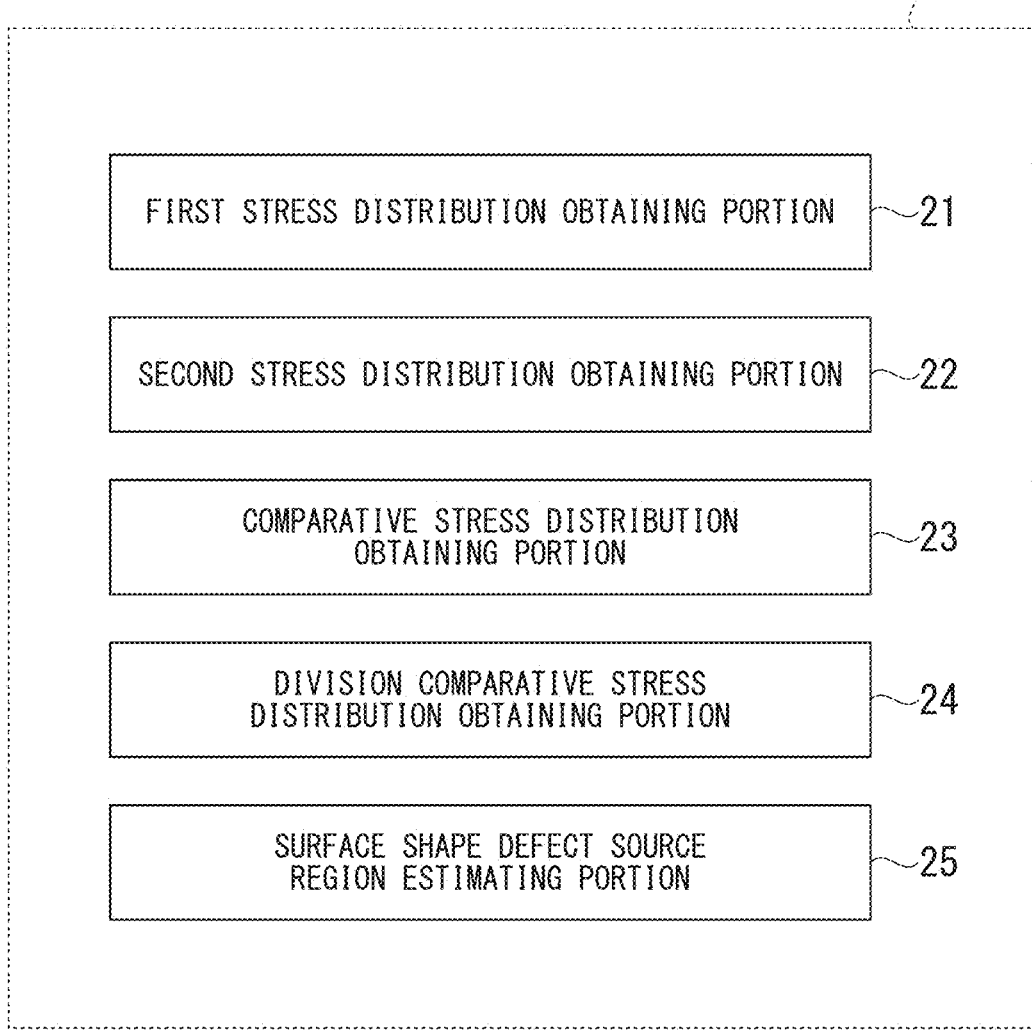
FIG. 14 is a schematic view illustrating a surface shape defect source region estimating device 20 according to a fourth embodiment of the present invention.

As illustrated in FIG. 13, the surface shape defect generating region estimating device 10 according to the embodiment includes a first stress distribution obtaining portion 11, a second stress distribution obtaining portion 12, a comparative stress distribution obtaining portion 13, a division comparative stress distribution obtaining portion 14, and a surface shape defect generating region estimating portion 15.

Since the description of each configuration element is similar to that of the surface shape defect generating region estimating method according to the first embodiment, overlapping description will be omitted.

In the first stress distribution obtaining portion 11, the first stress distribution $\sigma_{(T1)}$ which is distribution of the stress of the workpiece at the first working point of time $T_1$ that is after the deformation processing starting point of time $T_{START}$ and before the deformation processing ending point of time $T_{END}$, is obtained by the finite element method.

In the second stress distribution obtaining portion 12, the second stress distribution $\sigma_{(T2)}$ which is distribution of the stress of the workpiece at the second working point of time $T_2$ that is after the first working point of time $T_1$ and before or at the same time as the deformation processing ending point of time $T_{END}$, is obtained by the finite element method.

In the comparative stress distribution obtaining portion 13, the comparative stress distribution $\sigma_{(T1, T2)}$ which is distribution of the comparative stress of the workpiece is obtained based on comparison of the first stress distribution $\sigma_{(T1)}$ and second stress distribution $\sigma_{(T2)}$.

In the division comparative stress distribution obtaining portion 14, the division comparative stress distribution $\sigma_{DIV(T1, T2)}$ which is distribution of the comparative stress of each of the divided regions $D_K$ is obtained by dividing the comparative stress distribution $\sigma_{(T1, T2)}$ into the plurality of divided regions $D_K$.

In the surface shape defect generating region estimating portion 15, it is estimated whether or not each of the divided regions $D_K$ is the wrinkle generating region based on the surface shape defect generation evaluation index cc acquired with respect to each of the divided regions $D_K$ by using the division comparative stress distribution $\sigma_{DIV(T1, T2)}$.

In the surface shape defect generating region estimating device 10 according to the embodiment, similar to the surface shape defect generating region estimating method described in the first embodiment, it is possible to quantitatively estimate the wrinkle generating part of the press-formed article, and to reduce the number of processes or costs at the planning stage of investigating the forming method of the press-formed article.

Fourth Embodiment

A fourth embodiment of the present invention is a surface shape defect source region estimating device 20 which estimates the source region of the wrinkle generating region estimated by the above-described "surface shape defect generating region estimating device 10".

As illustrated in FIG. 13, the surface shape defect source region estimating device 20 according to the embodiment includes the region dividing process S21, the correction first stress distribution obtaining process S22, the correction second stress distribution obtaining process S23, the correction comparative stress distribution obtaining process S24, and the surface shape defect source region estimating process S25.

Since the description of each configuration element is similar to that of the surface shape defect source region estimating method according to the second embodiment, overlapping description will be omitted.

In the region dividing portion 21, the wrinkle generating region estimated by the surface shape defect generating region estimating device 10 described in the third embodiment is specified as the reference region $m_0$, and the periphery of the reference region $m_0$ is divided into the plurality of peripheral regions $m_k$.

In the correction first stress distribution obtaining portion 22, in the first stress distribution $\sigma_{(T1)}$, the correction first stress distribution $\sigma'_{(T1)}$ in a case where the stress value of an arbitrary peripheral region $m_n$ among the plurality of peripheral regions $m_k$ is changed is obtained for each of the peripheral regions $m_k$.

In the correction second stress obtaining portion 23, the correction second stress distribution $\sigma'_{(T2)}$ is obtained for each of the peripheral regions $m_k$ by performing the forming analysis by the finite element method to the second working point of time $T_2$ with respect to the correction first stress distribution $\sigma'_{(T1)}$.

In the correction comparative stress distribution obtaining portion 24, the correction comparative stress distribution $\sigma'_{(T1, T2)}$ is obtained by comparing the correction first stress distribution $\sigma'_{(T1)}$ and the correction second stress distribution $\sigma'_{(T2)}$ with respect to each of the peripheral regions $m_k$.

In the surface shape defect source region estimating portion 25, it is estimated whether or not each of the peripheral regions $m_k$ is the surface shape defect source region, based on the comparative value $\beta_{(mk, m0)}$ of the surface shape defect source evaluation index $\beta_{(mk)}$ in the reference region $m_0$ acquired by using the correction comparative stress distribution $\sigma'_{(T1, T2)}$ of each of the peripheral regions $m_k$ and the surface shape defect source evaluation index $\beta_{(m0)}$ in the reference region $m_0$ acquired by using the comparative stress distribution $\sigma_{(T1, T2)}$.

In the surface shape defect source region estimating device 20 according to the embodiment, similar to the surface shape defect source region estimating method described in the second embodiment, it is possible to quantitatively estimate the wrinkle source part of the press-formed article, and to reduce the number of processes or costs at the planning stage of investigating the forming method of the press-formed article.

Figure 15:
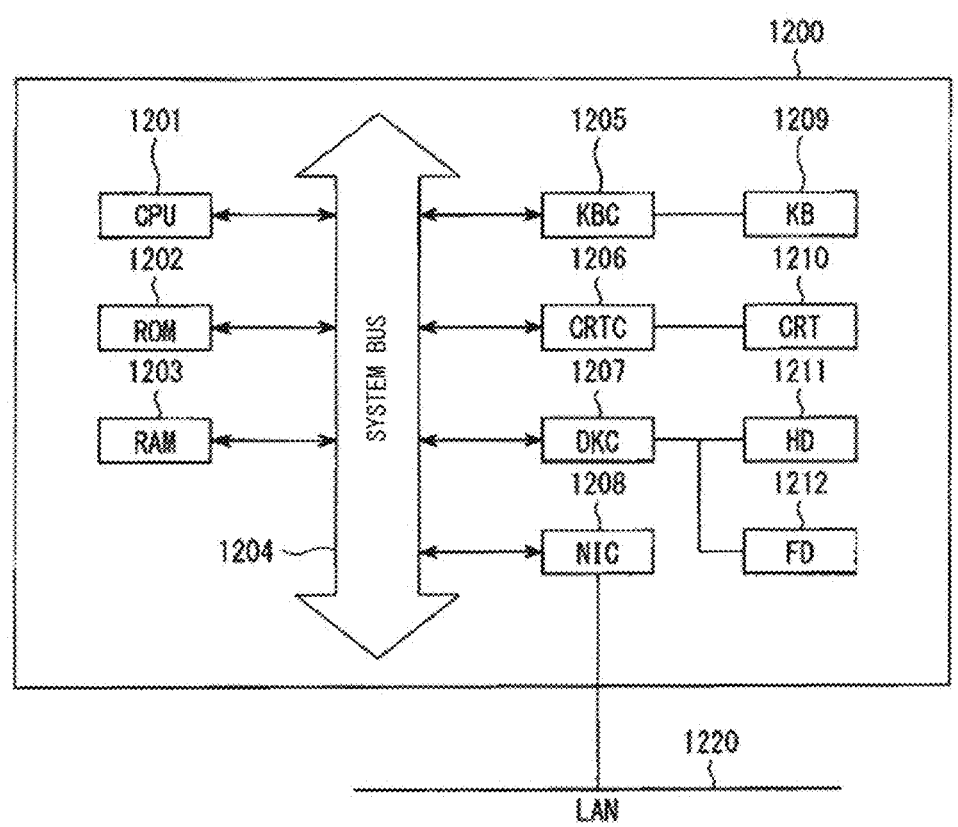
FIG. 15 is a view illustrating a system bus which operates a computer program.

In FIG. 15, a system bus which operates a computer program is illustrated.

A function of each unit that configures the above-described surface shape defect generating region estimating device 10 or the surface shape defect source region estimating device 20 can be realized by operating a program stored in a RAM or a ROM of the computer. Similarly, each step of the surface shape defect generating region estimating method and the surface shape defect source region estimating method can be realized as the program stored in the RAM or the ROM of the computer is operated. A storing medium which is readable by the program and the computer in which the program is recorded is included in the present invention.

Specifically, the program is recorded in the recording medium, such as a CD-ROM, or is provided in the computer via various transmission mediums. As the recording medium in which the program is recorded, in addition to the CD-ROM, it is possible to use a flexible disk, a hard disk, a magnetic tape, a magneto-optical disk, or a nonvolatile memory card. Meanwhile, as the transmission medium of the program, it is possible to use a communication medium in a computer network system for spreading and supplying program information as a carrier wave. Here, examples of the computer network include LAN, WAN, such as Internet, or a wireless communication network, and examples of the communication medium include a wired circuit or a wireless circuit, such as optical fiber.

In addition, the program included in the present invention is not limited to a program which realizes functions of the above-described embodiments as the computer executes the supplied program. For example, even in a case where the functions of the above-described embodiments are realized in cooperation with OS (operating system) or other applications which are operated by the program in the computer, the program is included in the present invention. In addition, even in a case where the functions of the above-described embodiments are realized as the entirety or a part of the processing of the supplied program are performed by a function extension board or a function extension unit of the computer, the related program is included in the present invention.

For example, FIG. 15 is a schematic view illustrating an inner configuration of a personal user terminal device. In FIG. 15, 1200 indicates a personal computer (PC) provided with a CPU 1201. The PC 1200 executes device control software which is stored in a ROM 1202 or a hard disk (HD) 1211 or which is supplied by a flexible disk (FD) 1212. The PC 1200 integrally controls each device connected to a system bus 1204.

By the program stored in the CPU 1201 and the ROM 1202 or the hard disk (HD) 1211 in the PC 1200, each order in the embodiment is realized.

1203 indicates RAM, and functions as a main memory or a work area of the CPU 1201. 1205 indicates a keyboard controller (KBC), and a keyboard (KB) 1209 controls instruction input from devices or the like which are not illustrated.

1206 indicates a CRT controller (CRTC), and controls display of a CRT display (CRT) 1210. 1207 indicates a device controller (DKC). DKC 1207 controls access to the hard disk (HD) 1211 in which a booting program, a plurality of applications, an editing file, a user file, and a network management program are stored; and the flexible disk (FD) 1212. Here, the booting program is an initiating program, that is, a program for starting the execution (operation) of hardware or software of a personal computer.

1208 indicates a network interface card (NIC), and bidirectionally exchanges data with a network printer, other network devices, or other PCs via a LAN 1220.

According to the above-described personal user terminal device, it is possible to quantitatively estimate the wrinkle generating region and the wrinkle source region of the press-formed article.

In this manner, the present invention includes the program for executing the surface shape defect generating region estimating method described in the first embodiment, the program for executing the surface shape defect generating region estimating method described in the second embodiment, and further, the recording medium which is readable by the computer in which the programs are recorded.

Above, the present invention is described in detail based on the embodiments, but the above-described embodiments are merely specific examples for realizing the present invention, and the technical range of the present invention is not limitedly interpreted only by the embodiments.

For example, in the description of the above-described embodiments, the press forming of the steel sheet is described as an example, but the present invention is not limited thereto, and the present invention can also be employed in roll forming of the steel sheet having a longitudinal shape or a hydro forming of a steel pipe. In addition, the material of the workpiece is not limited to steel, and a metal material, such as aluminum or titanium, a glass fiber reinforced resin material, such as FRP or FRTP, and a composite material of these materials, may be used.

In addition, wrinkles are described as an example of the surface shape defect, but the present invention can also be employed in a method for estimating a surface shape defect, such as a surface deflection.

INDUSTRIAL APPLICABILITY

According to the present invention, it is possible to provide a method, a device, a program, and a recording medium, for estimating generating regions or source regions of a surface shape defect of a deformation-processed product generated when performing deformation processing with respect to a workpiece.

BRIEF DESCRIPTION OF THE REFERENCE SYMBOLS

S STEEL SHEET
101 UPPER DIE (PUNCH)
102 BLANK HOLDER
103 LOWER DIE (DIE)
S11 FIRST STRESS DISTRIBUTION OBTAINING PROCESS
S12 SECOND STRESS DISTRIBUTION OBTAINING PROCESS
S13 COMPARATIVE STRESS DISTRIBUTION OBTAINING PROCESS
S14 DIVISION COMPARATIVE STRESS DISTRIBUTION OBTAINING PROCESS
S15 SURFACE SHAPE DEFECT GENERATING REGION ESTIMATING PROCESS
S21 REGION DIVIDING PROCESS
S22 CORRECTION FIRST STRESS DISTRIBUTION OBTAINING PROCESS
S23 CORRECTION SECOND STRESS OBTAINING PROCESS
S24 CORRECTION COMPARATIVE STRESS DISTRIBUTION OBTAINING PROCESS
S25 SURFACE SHAPE DEFECT SOURCE REGION ESTIMATING PROCESS

11 FIRST STRESS DISTRIBUTION OBTAINING PORTION
12 SECOND STRESS DISTRIBUTION OBTAINING PORTION
13 COMPARATIVE STRESS DISTRIBUTION OBTAINING PORTION
14 DIVISION COMPARATIVE STRESS DISTRIBUTION OBTAINING PORTION
15 SURFACE SHAPE DEFECT GENERATING REGION ESTIMATING PORTION
21 REGION DIVIDING PORTION
22 CORRECTION FIRST STRESS DISTRIBUTION OBTAINING PORTION
23: CORRECTION SECOND STRESS OBTAINING PORTION
24 CORRECTION COMPARATIVE STRESS DISTRIBUTION OBTAINING PORTION
25 SURFACE SHAPE DEFECT SOURCE REGION ESTIMATING PORTION

The invention claimed is:

1. A surface shape defect generating region estimating method for estimating generating regions of a surface shape defect of a deformation-processed product obtained by performing deformation processing with respect to a workpiece from a deformation processing starting point of time $T_{START}$ to a deformation processing ending point of time $T_{END}$, the method comprising:
 a first stress distribution obtaining process of obtaining first stress distribution $\sigma_{(T1)}$ which is distribution of a stress of the workpiece at a first working point of time $T_1$ that is after the deformation processing starting point of time $T_{START}$ and before the deformation processing ending point of time $T_{END}$, by a finite element method;
 a second stress distribution obtaining process of obtaining a second stress distribution $\sigma_{(T2)}$ which is distribution of a stress of the workpiece at a second working point of time $T_2$ that is after the first working point of time $T_1$ and before or at the same time as the deformation processing ending point of time $T_{END}$, by the finite element method;
 a comparative stress distribution obtaining process of obtaining comparative stress distribution $\sigma_{(T1, T2)}$ which is distribution of a comparative stress of the workpiece based on comparison of the first stress distribution $\sigma_{(T1)}$ and the second stress distribution $\sigma_{(T2)}$;
 a division comparative stress distribution obtaining process of obtaining division comparative stress distribution $\sigma_{DIV(T1, T2)}$ which is distribution of comparative stresses of each of divided regions $D_K$, by dividing the comparative stress distribution $\sigma_{(T1, T2)}$ into a plurality of divided regions $D_K$;
 a surface shape defect generating region estimating process of estimating whether or not each of the divided regions $D_K$ is a generating region of the surface shape defect, based on a surface shape defect generation evaluation index $\alpha$ acquired with respect to each of the divided regions $D_K$, by using the division comparative stress distribution $\sigma_{DIV(T1, T2)}$; and
 a process of performing a deformation process on the workpiece based on the estimating whether or not each of the divided regions $D_K$ is the generating region of the surface shape defect.

2. The surface shape defect generating region estimating method according to claim 1,
 wherein the surface shape defect generation evaluation index $\alpha$ is the minimum value of the comparative stress.

3. The surface shape defect generating region estimating method according to claim 1,
 wherein the surface shape defect generation evaluation index $\alpha$ is the maximum value of a difference in comparative stress between two elements separated from each other.

4. The surface shape defect generating region estimating method according to claim 1,
 wherein the surface shape defect generation evaluation index $\alpha$ is the maximum value of a difference gradient obtained by dividing the difference in comparative stress between two elements separated from each other by the separation distance.

5. The surface shape defect generating region estimating method according to claim 1,
 wherein, in the division comparative stress distribution obtaining process, a first divided region $D_1$ including an element of which the comparative stress is the minimum is defined as one of the plurality of divided regions $D_K$ in the comparative stress distribution $\sigma_{(T1, T2)}$, and a second divided region $D_2$ including an element of which the comparative stress is the minimum is defined as one of the plurality of divided regions $D_K$ in the comparative stress distribution $\sigma_{(T1, T2)}$ obtained by removing the first divided region $D_1$ from the comparative stress distribution $\sigma_{(T1, T2)}$.

6. The surface shape defect generating region estimating method according to claim 1,
 wherein, in the division comparative stress distribution obtaining process, the first divided region $D_1$ including two elements that are a combination in which a difference in comparative stress between the two elements separated from each other becomes maximized is defined as one of the plurality of divided regions $D_K$ in the comparative stress distribution $\sigma_{(T1, T2)}$, and the second divided region $D_2$ including two elements that are a combination in which a difference in comparative stress between the two elements separated from each other becomes maximized is defined as one of the plurality of divided regions $D_K$ in the comparative stress distribution $\sigma_{(T1, T2)}$ obtained by removing the first divided region $D_1$ from the comparative stress distribution $\sigma_{(T1, T2)}$.

7. The surface shape defect generating region estimating method according to claim 1,
 wherein, in the division comparative stress distribution obtaining process, the first divided region $D_1$ including two elements that are a combination in which a difference gradient obtained by dividing the difference in comparative stress between two elements separated from each other by the separation distance becomes maximized is defined as one of the plurality of divided regions $D_K$ in the comparative stress distribution $\sigma_{(T1, T2)}$, and the second divided region $D_2$ including two elements that are a combination in which a difference gradient obtained by dividing the difference in comparative stress between two elements separated from each other by the separation distance becomes maximized is defined as one of the plurality of divided regions $D_K$ in the comparative stress distribution $\sigma_{(T1, T2)}$ obtained by removing the first divided region D from the comparative stress distribution $\sigma_{(T1, T2)}$.

8. The surface shape defect generating region estimating method according to claim 1,
wherein the second working point of time $T_2$ is deformation processing ending point of time $T_{END}$.

9. The surface shape defect generating region estimating method according to claim 1,
wherein the workpiece is metal.

10. The surface shape defect generating region estimating method according to claim 1,
wherein the deformation processing is press forming.

11. The surface shape defect generating region estimating method according to claim 1,
wherein the surface shape defect is wrinkles.

12. The surface shape defect generating region estimating method according to claim 1, further comprising:
a region dividing process of specifying the generating regions of the surface shape defect that is estimated as a reference region $m_0$, and dividing the periphery of the reference region $m_0$ into a plurality of peripheral regions $m_k$ (k=1, 2, 3, ... n), n being an integer greater than 0;
a correction first stress distribution obtaining process of obtaining correction first stress distribution $\sigma'_{(T1)}$ in a case of changing a stress value of an arbitrary peripheral region among the plurality of peripheral regions $m_k$ for each of the peripheral regions mk in the first stress distribution $\sigma_{(T1)}$;
a correction second stress obtaining process of obtaining correction second stress distribution $\sigma'_{(T2)}$ for each of the peripheral regions mk by performing forming analysis with respect to the correction first stress distribution $\sigma'_{(T1)}$ by a finite element method to the second working point of time $T_2$;
a correction comparative stress distribution obtaining process of obtaining correction comparative stress distribution $\sigma'_{(T1, T2)}$ which is distribution of the correction comparative stress of the workpiece, based on comparison of the correction first stress distribution $\sigma'_{(T1)}$ and the correction second stress distribution $\sigma'_{(T2)}$, with respect to each of the peripheral regions $m_k$; and
a surface shape defect source region estimating process of estimating whether or not each of the peripheral regions $m_k$ is a surface shape defect source region, based on a comparative value $\beta_{(mk, m0)}$ of a surface shape defect source evaluation index $\beta_{(mk)}$ in the reference region $m_0$ acquired by using the correction comparative stress distribution $\sigma'_{(T1, T2)}$ of each of the peripheral region $m_k$, and a surface shape defect source evaluation index $\beta_{(m0)}$ in the reference region $m_0$ acquired by using the comparative stress distribution $\sigma_{(T1, T2)}$.

13. The surface shape defect source region estimating method according to claim 12,
wherein the surface shape defect source evaluation indices $\beta_{(mk)}$ and $\beta_{(m0)}$ are the minimum values of the correction comparative stress.

14. The surface shape defect source region estimating method according to claim 12,
wherein the surface shape defect source evaluation indices $\beta_{(mk)}$ and $\beta_{(m0)}$ are the maximum values of a difference in correction comparative stress between two elements separated from each other.

15. The surface shape defect source region estimating method according to claim 12,
wherein the surface shape defect source evaluation indices $\beta_{(mk)}$ and $\beta_{(m0)}$ are the maximum values of a difference gradient obtained by dividing a difference in correction comparative stress between two elements separated from each other by the separation distance.

16. A surface shape defect generating region estimating device which estimates a generating region of a surface shape defect of a deformation-processed product obtained by performing deformation processing with respect to a workpiece from a deformation processing starting point of time $T_{START}$ to a deformation processing ending point of time $T_{END}$, the device comprising:
processing circuitry configured to:
obtain first stress distribution $\sigma_{(T1)}$ which is distribution of a stress of the workpiece at a first working point of time $T_1$ that is after the deformation processing starting point of time $T_{START}$ and before the deformation processing ending point of time $T_{END}$, by a finite element method;
obtain second stress distribution $\sigma_{(T2)}$ which is distribution of a stress of the workpiece at a second working point of time $T_2$ that is after the first working point of time $T_1$ and before or at the same time as the deformation processing ending point of time $T_{END}$, by the finite element method;
obtain comparative stress distribution $\sigma_{(T1, T2)}$ which is distribution of a comparative stress of the workpiece based on comparison of the first stress distribution $\sigma_{(T1)}$ and the second stress distribution $\sigma_{(T2)}$;
obtain division comparative stress distribution $\sigma_{DIV(T1, T2)}$ which is distribution of the comparative stress of each of divided regions $D_K$, by dividing the comparative stress distribution $\sigma_{(T1, T2)}$ into a plurality of divided regions $D_K$; and
estimate whether or not each of the divided regions $D_K$ is a generating region of the surface shape defect, based on a surface shape defect generation evaluation index $\alpha$ acquired with respect to each of the divided regions $D_K$, by using the division comparative stress distribution $\sigma_{DIV(T1, T2)}$; and
performing a deformation process on the workpiece based on the estimating whether or not each of the divided regions $D_K$ is the generating region of the surface shape defect.

17. The surface shape defect generating region estimating device according to claim 16,
wherein the surface shape defect generation evaluation index $\alpha$ is the minimum value of the comparative stress.

18. The surface shape defect generating region estimating device according to claim 16,
wherein the surface shape defect generation evaluation index $\alpha$ is the maximum value of a difference in comparative stress between two elements separated from each other.

19. The surface shape defect generating region estimating device according to claim 16,
wherein the surface shape defect generation evaluation index $\alpha$ is the maximum value of a difference gradient obtained by dividing the difference in comparative stress between two elements separated from each other by the separation distance.

20. The surface shape defect generating region estimating device according to claim 16,
wherein a first divided region $D_1$ including an element of which the comparative stress is the minimum is defined as one of the plurality of divided regions $D_K$ in the comparative stress distribution $\sigma_{(T1, T2)}$, and a second divided region $D_2$ including an element of which the comparative stress is the minimum is defined as one of the plurality of divided regions $D_K$ in the comparative stress distribution $\sigma_{(T1, T2)}$ obtained by removing the first divided region $D_1$ from the comparative stress distribution $\sigma_{(T1, T2)}$.

21. The surface shape defect generating region estimating device according to claim 16,
wherein the first divided region $D_1$ including two elements that are a combination in which a difference in comparative stress between the two elements separated from each other becomes maximized is defined as one of the plurality of divided regions $D_K$ in the comparative stress distribution $\sigma_{(T1, T2)}$, and the second divided region $D_2$ including two elements that are a combination in which a difference in comparative stress between the two elements separated from each other becomes maximized is defined as one of the plurality of divided regions $D_K$ in the comparative stress distribution $\sigma_{(T1, T2)}$ obtained by removing the first divided region $D_1$ from the comparative stress distribution $\sigma_{(T1, T2)}$.

22. The surface shape defect generating region estimating device according to claim 16,
wherein the first divided region $D_1$ including two elements that are a combination in which a difference gradient obtained by dividing the difference in comparative stress between two elements separated from each other by the separation distance becomes maximized is defined as one of the plurality of divided regions $D_K$ in the comparative stress distribution $\sigma_{(T1, T2)}$, and the second divided region $D_2$ including two elements that are a combination in which a difference gradient obtained by dividing the difference in comparative stress between two elements separated from each other by the separation distance becomes maximized is defined as one of the plurality of divided regions $D_K$ in the comparative stress distribution $\sigma_{(T1, T2)}$ obtained by removing the first divided region $D_1$ from the comparative stress distribution $\sigma_{(T1, T2)}$.

23. The surface shape defect generating region estimating device according to claim 16,
wherein the second working point of time $T_2$ is deformation processing ending point of time $T_{END}$.

24. The surface shape defect generating region estimating device according to claim 16,
wherein the workpiece is metal.

25. The surface shape defect generating region estimating device according to claim 16,
wherein the deformation processing is press forming.

26. The surface shape defect generating region estimating device according to claim 16,
wherein the surface shape defect is wrinkles.

27. The surface shape defect generating region estimating device according to claim 16, wherein the processing circuitry is further configured to:
specify the generating regions of the surface shape defect that is estimated by the surface shape defect generating region estimating device as a reference region $m_0$, and divides the periphery of the reference region $m_0$ into a plurality of peripheral regions $m_k$ (k=1, 2, 3, ... n), n being an integer greater than 0;
obtain correction first stress distribution $\sigma'_{(T1)}$ in a case of changing a stress value of an arbitrary peripheral region $m_n$ among the plurality of peripheral regions $m_k$ for each of the peripheral regions $m_k$ in the first stress distribution $\sigma_{(T1)}$;
obtain correction second stress distribution $\sigma'_{(T2)}$ for each of the peripheral regions mk by performing forming analysis with respect to the correction first stress distribution $\sigma'_{(T1)}$ by a finite element method to the second working point of time $T_2$;
obtain correction comparative stress distribution $\sigma'_{(T1, T2)}$ which is distribution of the correction comparative stress of the workpiece, based on comparison of the correction first stress distribution $\sigma'_{(T1)}$ and the correction second stress distribution $\sigma'_{(T2)}$, with respect to each of the peripheral regions $m_k$; and
estimate whether or not each of the peripheral regions mk is a surface shape defect source region, based on a comparative value $\beta_{(mk, m0)}$ of a surface shape defect source evaluation index $\beta_{(mk)}$ in the reference region $m_0$ acquired by using the correction comparative stress distribution $\sigma'_{(T1, T2)}$ of each of the peripheral region mk, and a surface shape defect source evaluation index $\beta_{(m0)}$ in the reference region $m_0$ acquired by using the comparative stress distribution $\sigma_{(T1, T2)}$.

28. The surface shape defect source region estimating device according to claim 27,
wherein the surface shape defect source evaluation indices $\beta_{(mk)}$ and $\beta_{(m0)}$ are the minimum values of the correction comparative stress.

29. The surface shape defect source region estimating device according to claim 27,
wherein the surface shape defect source evaluation indices $\beta_{(mk)}$ and $\beta_{(m0)}$ are the maximum values of a difference in correction comparative stress between two elements separated from each other.

30. The surface shape defect source region estimating device according to claim 27,
wherein the surface shape defect source evaluation indices $\beta_{(mk)}$ and $\beta_{(m0)}$ are the maximum values of a difference gradient obtained by dividing a difference in correction comparative stress between two elements separated from each other by the separation distance.

31. A non-transitory computer-readable recording medium, storing a set of instructions, executable by a computer, to perform a method for estimating generating regions of a surface shape defect of a deformation-processed product obtained by performing deformation processing with respect to a workpiece from a deformation processing starting point of time $T_{START}$ to a deformation processing ending point of time $T_{END}$, the method comprising:
a first stress distribution obtaining process of obtaining first stress distribution $\sigma_{(T1)}$ which is distribution of a stress of the workpiece at a first working point of time $T_1$ that is after the deformation processing starting point of time $T_{START}$ and before the deformation processing ending point of time $T_{END}$, by a finite element method;
a second stress distribution obtaining process of obtaining a second stress distribution $\sigma_{(T2)}$ which is distribution of a stress of the workpiece at a second working point of time $T_2$ that is after the first working point of time $T_1$ and before or at the same time as the deformation processing ending point of time $T_{END}$, by the finite element method;
a comparative stress distribution obtaining process of obtaining comparative stress distribution $\sigma_{(T1, T2)}$ which is distribution of a comparative stress of the workpiece based on comparison of the first stress distribution $\sigma_{(T1)}$ and the second stress distribution $\sigma_{(T2)}$;
a division comparative stress distribution obtaining process of obtaining division comparative stress distribution $\sigma_{DIV(T1, T2)}$ which is distribution of comparative stresses of each of divided regions $D_K$, by dividing the comparative stress distribution $\sigma_{(T1, T2)}$ into a plurality of divided regions $D_K$;

a surface shape defect generating region estimating process of estimating whether or not each of the divided regions $D_K$ is a generating region of the surface shape defect, based on a surface shape defect generation evaluation index $\alpha$ acquired with respect to each of the divided regions $D_K$, by using the division comparative stress distribution $\sigma_{DIV(T1, T2)}$; and a process of performing a deformation process on the workpiece based on the estimating whether or not each of the divided regions $D_K$ is the generating region of the surface shape defect.

32. The non-transitory computer-readable recording medium according to claim 31, the method further comprising:

a region dividing process of specifying the generating regions of the surface shape defect that is estimated as a reference region $m_0$, and dividing the periphery of the reference region $m_0$ into a plurality of peripheral regions mk (k=1, 2, 3, ... n), n being an integer greater than 0;

a correction first stress distribution obtaining process of obtaining correction first stress distribution $\sigma'_{(T1)}$ in a case of changing a stress value of an arbitrary peripheral region $m_n$ among the plurality of peripheral regions $m_k$ for each of the peripheral regions mk in the first stress distribution $\sigma_{(T1)}$;

a correction second stress obtaining process of obtaining correction second stress distribution $\sigma'_{(T2)}$ for each of the peripheral regions $m_k$ by performing forming analysis with respect to the correction first stress distribution $\sigma'_{(T1)}$ by a finite element method to the second working point of time $T_2$;

a correction comparative stress distribution obtaining process of obtaining correction comparative stress distribution $\sigma'_{(T1, T2)}$ which is distribution of the correction comparative stress of the workpiece, based on comparison of the correction first stress distribution $\sigma'_{(T1)}$ and the correction second stress distribution $\sigma'_{(T2)}$, with respect to each of the peripheral regions $m_k$; and a surface shape defect source region estimating process of estimating whether or not each of the peripheral regions $m_k$ is a surface shape defect source region, based on a comparative value $\beta_{(mk, m0)}$ of a surface shape defect source evaluation index $\beta_{(mk)}$ in the reference region $m_0$ acquired by using the correction comparative stress distribution $\sigma'_{(T1, T2)}$ of each of the peripheral region $m_k$, and a surface shape defect source evaluation index $\beta_{(m0)}$ in the reference region $m_0$ acquired by using the comparative stress distribution $\sigma_{(T1, T2)}$.

* * * * *